Jan. 18, 1966 F. K. H. NALLINGER ETAL 3,229,546

SPEED CONTROL SYSTEM FOR VEHICLES

Filed Aug. 25, 1961 4 Sheets-Sheet 1

FIG. I

INVENTORS
FRIEDRICH K. H. NALLINGER
HANS-JOACHIM M. FÖRSTER
ARWED VON KOCH
BY Dicke and Craig
ATTORNEYS

SPEED CONTROL SYSTEM FOR VEHICLES

INVENTORS
FRIEDRICH K. H. NALLINGER
HANS-JOACHIM M. FÖRSTER
ARWED VON KOCH
BY
Dicke and Craig
ATTORNEYS

SPEED CONTROL SYSTEM FOR VEHICLES

Filed Aug. 25, 1961 4 Sheets-Sheet 3

INVENTORS
FRIEDRICH K.H. NALLINGER
HANS-JOACHIM M. FÖRSTER
ARWED VON KOCH
BY
Dicke and Craig
ATTORNEYS

SPEED CONTROL SYSTEM FOR VEHICLES

INVENTORS
FRIEDRICH K. H. NALLINGER
HANS-JOACHIM M. FÖRSTER
ARWED VON KOCH
BY Dicke and Craig
ATTORNEYS 3,229,546
Patented Jan. 18, 1966

3,229,546

SPEED CONTROL SYSTEM FOR VEHICLES

Friedrich K. H. Nallinger, Stuttgart, Hans-Joachim M. Förster, Stuttgart-Bad Cannstatt, and Arwed von Koch, Stuttgart-Sonnenberg, Germany, assignors to Daimler-Benz Aktiengesellschaft, Stuttgart-Unterturkheim, Germany Filed Aug. 25, 1961, Ser. No. 133,958
Claims priority, application Germany, Aug. 26, 1960, D 34,103
44 Claims. (Cl. 74—472)

The present invention relates to a method and installation for automatically regulating the driving speed of engine-driven vehicles, especially motor vehicles, in which a predetermined or preselected desired value or magnitude for the vehicle speed is compared with the measured existing value or magnitude of the prevailing vehicle speed, and in which with deviations of both values from one another control pulses are produced which adjust by means of an adjusting motor the control member for the driving engine of the vehicle, for example, the throttle valve thereof.

Regulating methods of the aforementioned type are known, in general, as so-called speed limit devices, the desired speed value of which is either predetermined beforehand to a certain vehicle speed or also is adapted to be adjusted to different speeds. The known prior art methods, however, entail the disadvantage that a separate adjusting operation each is required for the starting or initiation of the control. Additionally, in these prior art systems, no speed regulation usually takes place below the preselected or adjusted desired value.

The present invention aims at eliminating the aforementioned disadvantages. Accordingly, the present invention essentially consists in preselecting or predetermining the "desired value" by the respective position of the actuating member to be operated by the driver, for example, of the gas pedal for the control member of the driving engine. Consequently, whereas in the prior art there corresponds a certain position of the control member to each position of the actuating member according to the present invention, the actuating member itself becomes the speed selector, whereby the actuating member may be completely separate from the control member, and there is preferably coordinated to its possible path the possible driving speed at least approximately linearly. The transmission ratio between actuating member and control member, which are preferably operatively connected with each other by a suitable linkage, is thereby adjusted by engagement of the adjusting motor. However, the control member may also be actuated according to the method and apparatus of the present invention by a power or servo-shifting member.

According to the present invention, the velocity of the adjusting motor may be so controlled in dependence on magnitude of the difference or deviation of the "existing value" from the "desired value" either in a step-like manner or continuously that with an increasing deviation or difference the speed also increases. Consequently, in addition to the tendency of the deviation also the magnitude thereof is ascertained either continuously or in a step-like manner and the adjusting motor responds to the latter value with respect to its velocity. The magnitude of the deviation may serve, independently of its tendency, either alone or additionally for the starting or engagement of a shifting-back operation of the change-speed transmission and/or for the actuation of the vehicle brake, and may possibly also delay this starting or engagement by appropriate blocking or delay means for such length of time until the control member for the driving engine or of the adjusting motor or the adjusting member reaches one of its end positions.

For purposes of limiting the driving speed to a predetermined "desired value," the stroke of the actuating member or a part rigidly connected therewith may be limited by an abutment and this abutment may be adjusted by a separate adjusting mechanism into different positions thereof. Furthermore, the speed regulation may appropriately be rendered ineffective below a predetermined minimum speed for example, by the fact that the transmitter means producing the "existing value" cannot drop below a position corresponding to this minimum speed by reason of spring pre-tensioning means or the like.

The method and apparatus according to the present invention offers the advantage that generally the control operates completely automatically, without any special separate adjusting or engaging operation, with any desired position of the actuating member. Only when a limitation in the vehicle speed to a predetermined value becomes desirable, then the aforementioned adjustment to such a value can take place whereby, however, also below this adjustment the respective position of the gas pedal is to continue to serve as "desired value" preselector.

An arrangement for realizing the method according to the present invention consists in providing a measuring device for measuring the existing velocity which operates according to the tachometer principle and by securing to the shaft of such measuring device a pointer-like arm with possibly adjustable contacts serving as transmitter means for producing the "existing value," and by rotatably supporting on the same shaft a double-armed lever provided with possibly adjustable contacts as the transmitter means for producing the "desired value" whereby the contacts of the transmitter means producing the "desired value" enclose therebetween the contacts of the transmitter means producing the "existing value." An electric motor adapted to be selectively energized for rotation in either direction, of known prior art construction, thereby serves as adjusting motor which drives through a worm wheel drive or the like a longitudinally movable adjusting member. The contacts at the transmitter means producing the "existing value" and at the transmitter means producing the "desired value" thereby serve as selective switch means corresponding to the tendency of the deviation, and a set of contacts is thereby connected in each energizing circuit of the motor, possibly over relays, and in series therewith a limit switch to be automatically actuated by the adjusting member itself.

The arrangement of the pulse producing means serving as selective switch means may also be made in such a manner that the contacts of the transmitter means producing the "existing value" enclose therebetween the contacts of the transmitter means producing the "desired value." Furthermore, in order to consider the magnitude of the variation or the deviation, several springy contacts may be arranged one behind the other, each of which is operatively connected through a separate resistance and possibly a relay with the energizing circuit of the electric motor. The adjustability of the contacts with respect to the supports thereof provides the possibility of varying the tolerances.

A hydraulic installation for the method according to the present invention is utilized preferably, though not exclusively, in vehicles in which there exists an already present pressure medium system in which a pressure is continuously adjustable in dependence on the driving speed. This arrangement thereby essentially consists in utilizing a piston loaded by the regulating pressure and movable against a spring force which serves as transmitter means for producing the "existing value" and by associating with or coordinating to this piston a second piston operatively connected with the actuating member, for example, with the gas pedal and serving as transmitter means for producing the "desired value" in such a manner that in a coincidence position of the control members of both pistons the path for the pressure medium from the pressure medium system to the adjusting motor is blocked and with a mutually deviating position of the two pistons with respect to each other such path is opened. The piston serving as transmitter means for producing the "existing value" may thereby be constructed as plunger piston and the piston serving as transmitter means for producing the "desired value" may be arranged within this plunger piston, whereas a longitudinally movable adjusting piston adapted to be loaded unilaterally against a spring effect serves as adjusting motor. Of course, a separate pressure circuit for the control installation could also be used within the scope of the present invention.

In the aforementioned installations as well as in analogous installations, the actuating member, for example, the gas pedal is operatively connected in accordance with the present invention by means of a linkage with the transmitter means producing the "desired value" and by means of a coupling member, adapted to be adjusted by means of the adjusting motor through the adjusting member, with the linkage leading to the control member, for example, to the throttle valve in such a manner that in each position of the adjusting member the control member can still be closed mechanically by the actuating member thereof.

A two-armed lever thereby serves as coupling member which is connected at one end thereof indirectly with the gas pedal and at the other end thereof with the linkage leading to the control member, and which is supported intermediate these two ends by means of an elongated aperture on a pin of the adjusting member adapted to be moved longitudinally by the adjusting motor. Another possibility according to the present invention consists in rotatably connecting the coupling member with a similar lever whereby this lever is supported within the relatively fixed housing and the coupling member is supported on the adjusting member, and whereby the coupling member engages into an arm of a shaft connected with the actuating member and the lever into an arm of a shaft connected with the control member, and both shafts are disposed with respect to each other coaxially or in alignment.

The linkage arrangement according to the present invention entails the advantage of a simple construction. Furthermore, in case of loss of the adjusting forces, for example, in case of loss of current or pressure oil or the like, the control member of the vehicle can be taken back in any case to the zero position thereof and the vehicle may thereby be stopped. Moreover, in almost all cases there remains also possible a sufficient driving operation. Additionally, at least a part of the movement of the actuating member is transmitted directly to the conrol member so that the latter always responds instantaneously to any change.

If, for purposes of overcoming the return springs, especially in modern multi-stage carburetors, in part considerable forces are required, it is proposed according to the present invention to interconnect or insert into the linkage leading to the control member a servo-shifting member consisting of transmitter and amplifier or repeater. For that purpose, a first lever leading to the control member is connected with the amplifier and with the control member whereas the coupling member engages with a second lever influencing the transmitter which second lever is supported with play with respect to the first lever and is adapted to be tilted about the point of engagement of the first lever at the amplifier in proportion to the existing play.

According to a modified embodiment of the present invention, an electric adjusting motor rotatable in both directions of rotation is adapted to be controlled, possibly through two relays, by means of two transistors serving as selective switch means which are connected between the "desired-value" line and the "existing-value" line in such a manner that during flow of current from the "desired-value" line to the "existing-value" line one of the transistors energizes the adjusting motor in the one direction of rotation whereas during flow of current in the opposite direction the other transistor energizes the adjusting motor in the opposite direction of rotation. A variable control resistance connected as potentiometer is thereby provided between the "desired-value" line and the "existing-value" line whereby the potentiometer arm which is adapted to be moved by the gas pedal is connected with the "existing-value" line through a rectifier and a transmitter means dependent on the vehicle speed, whereas one terminal of this resistance leads to the "desired-value" line and one terminal of the power supply and the other terminal of this resistance leads to the other terminal of the power supply. There may be provided, additionally to the aforementioned transmitter and in parallel thereto, a further transmitter dependent on the engine rotation speed. The selective engagement of a respective transmitter takes place appropriately in dependence on the vehicle speed.

With all the installations mentioned hereinabove, there may be coordinated to the actuating member, for example, to the gas pedal, or to a linkage part rigidly connected therewith, a resilient or springy abutment adapted to be adjusted to a predetermined driving speed which is effective as resilient pressure point. This abutment may be adjusted, for example, by means of a push button or by means of rotatable knob arranged at the dashboard or at the steering column to a predetermined vehicle speed value. During the drive the gas pedal is thereby maintained by the foot of the operator only in abutment against the pressure point. Furthermore, there may be coordinated to the actuating member a holding magnet the energizing circuit of which includes series-connected switches provided at the clutch and brake pedal as well as a switch adapted to be selectively actuated at the will of the driver. By the use of such an arrangement, the driver's foot may be taken off the gas pedal altogether. The springy abutment may itself be constructed as holding magnet for a setting or stopping in the predetermined position.

Accordingly, it is an object of the present invention to provide a speed regulating system for vehicles, especially motor vehicles, which effectively eliminates the shortcomings and disadvantages of the prior art systems.

Another object of the present invention resides in the provision of a speed regulating system for vehicles which is operative to effect a speed regulation or control, not only above the predetermined desired speed limit but also throughout the speed range below this predetermined speed limit.

Still a further object of the present invention resides in the provision of a speed regulating system for vehicles, especially motor vehicles, which enables an effective speed regulation throughout the entire adjusting range up to the predetermined speed limit but which automatically renders the regulating system inoperative when the speed of the vehicle reaches a certain minimum driving speed.

A further important feature and object of the present invention resides in the provision of a regulating system for regulating the speed of a motor vehicle in which no separate, special adjusting operation is required for the release of a respective regulating operation of the speed.

A further object of the present invention resides in the provision of a regulating member in which the actuating member, normally present for actuating the control member of the driving engine is used itself and becomes effective as speed selector.

A further significant feature of the present invention resides in the provision of a method and apparatus for controlling the driving speed of a vehicle which is operative to limit the maximum speed of the vehicle, and which is completely automatically operative, without any separate adjustment or adjusting operation, in each position of the actuating member for the engine control.

Still a further object of the present invention resides in the provision of a speed regulating and limiting system for motor vehicles in which, notwithstanding a completely automatic adjustment of the engine control member in dependence on the position of the actuating member for the engine control member within a range of speeds between a minimum speed and a predetermined maximum speed, the engine control member may, at all times, also be actuated mechanically by the actuating member to assure, in addition to the automatic regulation, a manually operative selective control and operation thereof.

Another object of the present invention resides in the provision of a speed regulating and speed limiting means for a motor vehicle in which safety means are provided to enable stoppage of the vehicle in case of failure of the power assist sources.

Still a further object of the present invention resides in the provision of a speed regulating limit means for motor vehicles driven by an engine having an engine control member in which at least a part of the movement of the actuating member is transmitted directly to the control member so that the latter always responds to any change in the position of the actuating member.

Another object of the present invention resides in the provision of a regulating system adapted to operate for the aforementioned purposes which is relatively simple in construction, reliable and safe in operation and adapted to be used with conventional motor vehicles.

These and other objects, features and advantages of the present invention will become more obvious from the following description when taken in connection with the accompanying drawing which shows, for purposes of illustration only, several embodiments in accordance with the present invention, and wherein FIGURE 1 is a schematic diagram of a first embodiment of a mechanical speed regulating installation in accordance with the present invention;

Figure 6:
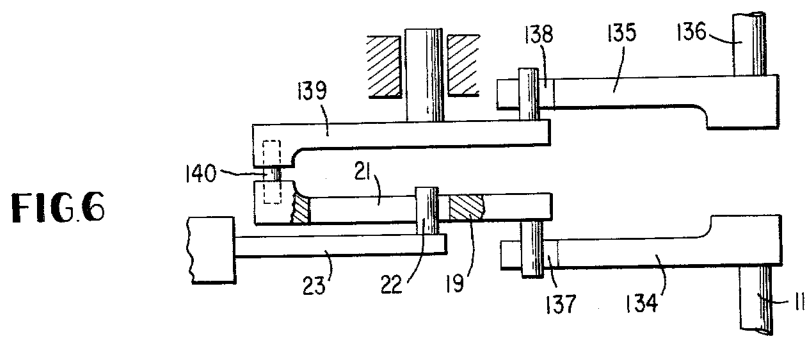
Figure 7:
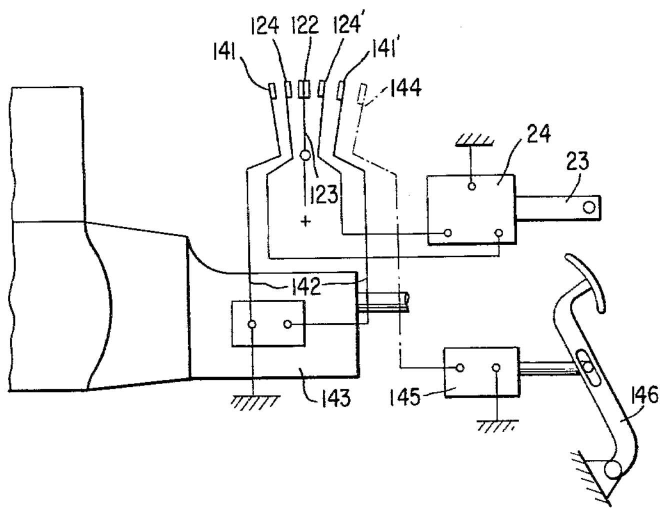

FIGURE 6 is a partial schematic view illustrating a modified embodiment of certain details of the control system in accordance with the present invention, and FIGURE 7 is a partial schematic view illustrating further details of a further modified embodiment of a regulating system in accordance with the present invention adapted to be used, in an analogous manner, with the regulating systems mentioned hereinabove.

In the specification and claims herein, the term "desired value" or "desired magnitude" is used to designate the value or magnitude corresponding to the predetermined or preselected speed whereas the term "existing value" or "existing magnitude" refers to the value or magnitude corresponding to or proportional to the prevailing or existing speed of the vehicle. Similarly, the term "transmitter means for producing the desired value" refers to the structure producing a value or control magnitude representative of the desired predetermined regulated speed whereas the "transmitter means for producing the existing value" refers to the structure producing a value or control magnitude representative of the existing or prevailing speed.

Figure 1:
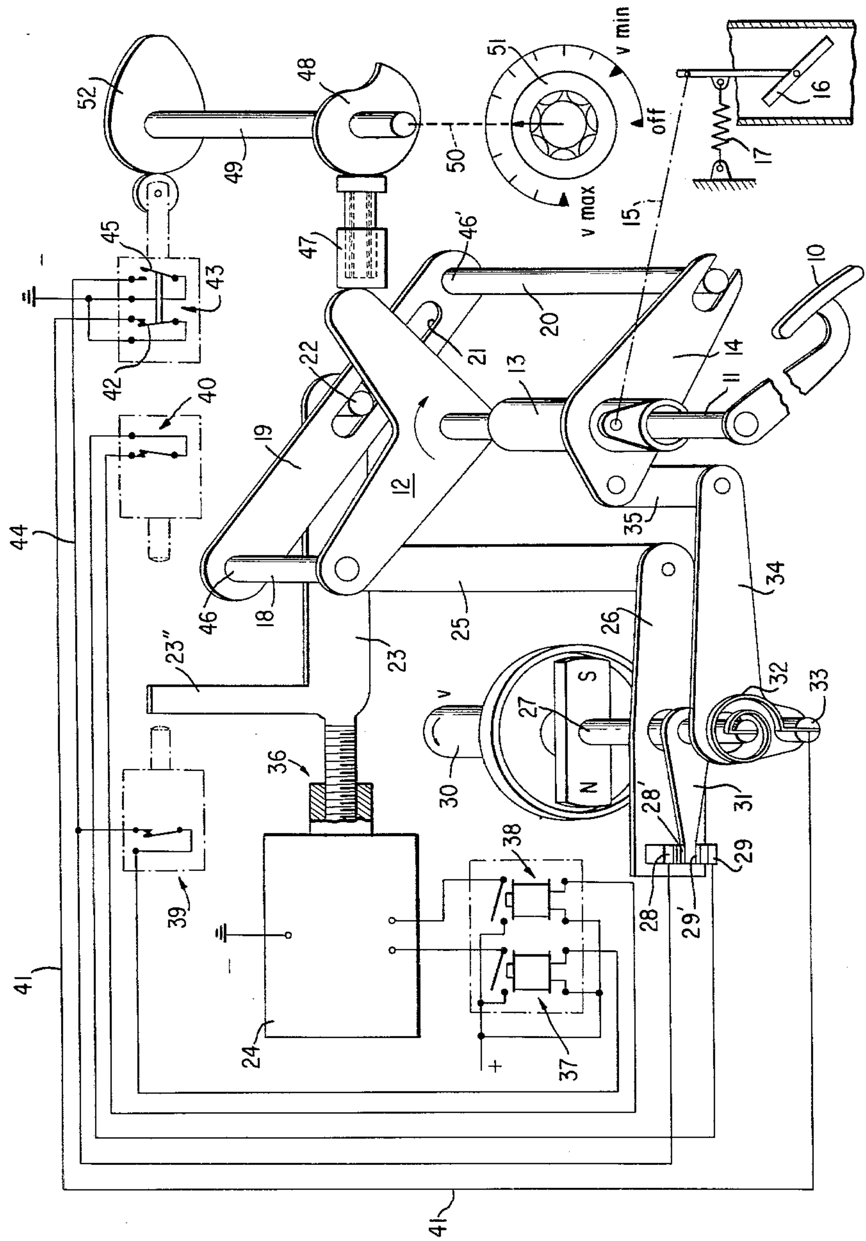

Referring now to the drawing wherein like reference numerals are used throughout the various views to designate corresponding parts, and more particularly to FIGURE 1, reference numeral 10 designates therein the gas pedal which is secured either directly or indirectly at a shaft 11 rotatably supported in a relatively fixed part of the vehicle. The shaft 11 carries a bell crank 12 mounted thereon for rotation in unison therewith. A sleeve 13 provided with a two-armed lever 14 is freely rotatably supported on the shaft 11. The two-armed lever 14 is operatively connected with the throttle valve 16 of the driving engine or with a similar control member through a suitable linkage 15, illustrated herein only schematically. A return spring 17 is operatively associated, in a manner known per se, with the throttle valve 16.

A two-armed lever 19 is operatively connected with the bell crank 12 by means of an intermediate rod 18. The two-armed lever 19 serves as coupling member and constitutes the sole connection between the shaft 11 rigidly connected with the gas pedal and the sleeve 13 rigidly connected with the throttle valve 16. The two-armed lever 19 is connected with one arm of the lever 14 by means of a rod 20 or the like. The two-armed lever 19 is provided intermediate the points of engagement 46 and 46' of the rods 18 and 20 with an elongated aperture 21 and is supported by means of this elongated aperture 21 on a pin 22. The pin 22, in turn, is secured on a rod 23 serving as control member which is adapted to be moved in the longitudinal direction thereof by means of an adjusting motor 24 in a manner to be described more fully hereinafter. The coupling member 19 is so arranged that the points of engagement 46 and 46' of the rods 18 and 20, respectively, are disposed, in the idling position of the gas pedal 10 or of the throttle valve 16, in the plane of movement of the pin 22. In other words, when the gas pedal 10 and/or throttle valve 16 are in a position corresponding to the idling position of the engine, the coupling member 19 and more particularly its aperture 21 is arranged coplanar with the direction of movement of pin 22, i.e., coplanar with the axis of rod 23.

A further rod 25 engages with the same arm of the bell crank 12 which rod 25 is operatively connected with a two-armed lever 26. The two-armed lever 26 serves as transmitter means for producing the "desired value" and is rotatably supported on the shaft 27 of a tachometer-like transmitter means for producing the "existing value." Contacts 28 and 29 which may be adjustable in the mutual distance to each other, are disposed at the end of the lever 26.

The transmitter means for producing the "existing value" operates in a known manner according to the tachometer principle whereby the driving speed is transmitted to the measuring device through a shaft 30. There is secured on the aforementioned shaft 27 a lever 31 or cam or the like, corresponding in its function to the tachometer hand or pointer which constitutes a contact finger with two contacts 28' and 29' and is disposed between the two aforementioned contacts 28 and 29 of the transmitter means for producing the "desired value." One contact each at the transmitter means for the "desired value" and at the transmitter means for the "existing value" belong together as pair of contacts 28, 28' and as pair of contacts 29, 29', respectively.

The shaft 27 is provided with a relatively weak return spring 32, the abutment or support 33 of which is disposed on a bell crank 34 which in turn is connected by means of a shackle 35 with the lever 14, itself rigidly connected with the sleeve 13. By the use of such an arrangement the actual movement of the throttle valve 16 is transmitted to the return spring 32. This feed-back avoids the so-called "over regulation," i.e., an excessively large swinging or hunting about the corresponding "desired value." The spring 32 has such a pretension, possibly such an adjustable pre-tension, that the "existing value" transmitter means 31 always is in a position which corresponds to a predetermined minimum velocity, for example, 20 kilometers per hour, when the "desired value" transmitter means is in the zero position corresponding to the idling position thereof.

The adjusting motor 24 is an electric motor of conventional construction adapted to be switched for rotation in either direction thereof. The electric motor 24 drives as control member through a conventional screw-drive 36 the aforementioned rod 23 in the longitudinal axis thereof in the one or the other direction depending on the direction of rotation of the adjusting motor 24. Each energizing winding of the adjusting motor 24 is controlled by a corresponding relay 37 and 38, respectively. As selector switches for selecting the direction of rotation of the motor 24 serve the aforementioned contact pairs 28, 28' and 29, 29', provided at the "existing value" transmitter means and "desired value" transmitter means. The one contact pair 28, 28' and in series therewith a limit switch 39 are connected into the energizing circuit of relay 37. The other contact pair 29, 29' and a limit switch 40 are correspondingly connected in series into the energizing circuit of the other relay 38.

A switch 42 of a double-throw switch generally designated by reference numeral 43 and common to both energizing circuits is included in the return line 41 leading to shaft 27 or lever 34. A line 44 leads from the limit switch 39 to the other switch 45 of the same double-throw switch 43. The switch 45 is effectively connected with the transmitter means in parallel with the pair of contacts 28 and 28'. The switches 42 and 45 are so constructed and arranged that the switch 42 is closed when the switch 45 is open and vice versa. The actuation of the switch 43 takes place by a disengaging device to be described more fully hereinafter.

*Operation*

The operation of the installation of FIGURE 1 so far described is as follows.

During standstill of the vehicle, the control member 23 is disposed completely to the left as viewed in FIGURE 1 in what will be referred to as the "up" position thereof, and the limit switch 39 is opened by engagement of projection 23'' provided on control member 23 whereas the contact pair 28, 28' is closed since the "existing value" transmitter means 31 is in the position thereof corresponding to the minimum speed of, for example, 20 kilometers per hour. The engine is started in the usual manner with the parts in these positions. Even if the gas pedal 10 is actuated during this time, the regulating system does not respond since the limit switch 39 at first remains open. During starting, the shaft 11 and therewith the bell crank 12 are rotated in the clockwise direction up to the desired position thereof by a corresponding actuation of the gas pedal 10. The coupling member 19 rotates simultaneously therewith in the same clockwise direction about the stationary pin 22 as its axis of rotation. As a result of such rotation of coupling member 19 which is transmitted by the rod 20 to the lever 14 rigidly connected with the sleeve 13, the throttle valve 16 is opened by means of linkage 15 connected with sleeve 13 and the vehicle is accelerated. During rotation of bell crank 12, the lever 26 serving as "desired value" transmitter means is rotated at the same time in the counterclockwise direction by rod 25 which, however, produces no further consequences since the contact pair 28 and 28' had been closed already previously.

The linkage transmission ratio between the gas pedal 10 and the throttle valve 16 is so selected that with a purely mechanical actuation the latter always opens too far. The vehicle, therefore, seeks to accelerate above the speed corresponding to the gas pedal position. The "existing value" transmitter means 31 thereby deflects toward the opposite side and closes, instead of the pair of "up" contacts 28 and 28', the pair of "down" contacts 29 and 29'. As a result of closure of contacts 29 and 29' and by reason of the closed limit switch 40, the relay 38 is energized and energizes the adjusting motor 24 to rotate in the "down" direction. Rotation in the "down" direction by motor 24 is converted through the screw-thread connection 36 to move the control member 23 axially toward the right as viewed in FIGURE 1 whereby such movement of the control member 23 effects rotation, by means of pin 22, of the coupling member 19 about the axis of rotation 46 so that the throttle valve 16 is moved in the closing direction thereof.

This operation continues for such length of time until the vehicle again attains the velocity corresponding to the position of the gas pedal 10. When such speed is attained, the "existing value" transmitter means 31 lifts off and therewith disengages both of its contacts 28, 29 from contacts 28', 29' by assuming a position intermediate the contacts 28' and 29' so that both relays 37 and 38 are deenergized and the adjusting motor 24 remains stationary. Consequently, the control member 23 remains stationary in a corresponding mid-position. This position and this vehicle speed are maintained with the same gas pedal position for such length of time as the external driving resistances acting on the vehicle do not change. It is assumed that the gas pedal 10 is now retained by the foot of the operator.

If now the vehicle reaches, for example, a downward incline, then the driving resistance becomes smaller. As a result thereof, the vehicle speed increases and the "existing value" transmitter means 31 operative according to the tachometer principle rotates in the counterclockwise direction with respect to the "desired value" transmitter means 26 which in the meantime is kept fixed by the gas pedal 10, assumed to remain also in its pre-existing position. As a result thereof, the "down" contact pair 29, 29' closes, the relay 38 is energized and the adjusting motor 24 rotates in the "down" direction and thereby moves the control rod 23 toward the right as viewed in FIGURE 1. As a result thereof, the pin 22 is also displaced toward the right within the elongated aperture 21 and thereby pivots or swings the coupling member 19 about its upper stationary point of rotation 46. The sleeve 13 is thereby also moved in the counterclockwise direction and the throttle valve 16 is more or less closed through linkage 15. As soon, however, as the "desired" velocity predetermined by the gas pedal position 10 is again attained, the "existing value" transmitter means 31 opens the contacts 29, 29' and the adjusting motor 24 stops so that now the "desired" velocity is maintained with another position of throttle valve 16.

With an increasing driving resistance, i.e., for example, at a rising incline, the same regulating operation takes place in the opposite direction in that with a decreasing driving velocity the "existing value" transmitter means 31 rotates in the clockwise direction and therewith closes the "up" contact pair 28, 28' and energizes the adjusting motor 24 through relay 37 in the "up" direction for such length of time until with another throttle valve position, the "desired" velocity corresponding to the position of the gas pedal is again attained. In all of these regulating operations, the control member 23 remains stationary in its mid-position.

The same operation takes place, in an analogous manner, if the velocity is changed by means of the gas pedal 10. At first, the movement of the gas pedal 10 is mechanically transmitted to the throttle valve 16 through linkage 11, 12, 18, 19, 20, 14 and 15. The "up" contact pair 28, 28' is simultaneously closed, for example, while giving gas, and the adjusting member 23 is adjusted in the corrsponding direction. If the new speed is now attained, then the adjusting motor 24 is again stopped because the contact pair 28, 28' again opens. Possibly, the regulation may pass for a short period of time through a "down" operation only to eventually oscillate or swing into the desired mid-position. When taking the foot off the gas pedal 10, the same operation takes place in inverse order. Also after termination of these operations, the control member 23 is disposed in a corresponding mid-position.

If the gas pedal 10 is taken back into the idling position, for example, to let the vehicle run out, then at first the regulation takes place in the "down" direction which, however, has no influence on the throttle valve 16 since the coupling member 19 is now disposed essentially horizontally, i.e., in the same plane as the axis of movement of the control rod 23, so that the elongated aperture 21 is disposed within the plane of movement of the pin 22. If the vehicle falls below the adjusted minimum speed, then the transmitter means closes the "up" contacts 28, 28' and the adjusting motor 24 moves the adjusting member 23 toward the left, again without influencing the throttle valve 16 until the limit switch 39 is opened by projection 23'.

In order to limit the vehicle speed to a predetermined value by the stroke of the gas pedal 10, a springily or resiliently constructed abutment 47 is provided at the bell crank 12 which is adapted to be adjusted by means of a cam disk 48 or of an adjusting screw to a predetermined speed value. The shape of the cam 48 as well as the other leverages are so selected that the possible driving speed is coordinated approximately linearly to the possible path of the gas pedal 10. The cam disk 48 is arranged on a shaft 49 which in turn is adapted to be rotated by means of a flexible shaft or the like from an adjusting knob 51. The adjusting knob 51 may be arranged in any suitable place of the vehicle, for example, at the dash-board of the vehicle.

A further cam 52 for the shifting switch 43 is also arranged on the shaft 49 carrying the adjusting cam 48. The cam 52 is so arranged that in the illustrated position, i.e., with an engaged operative speed regulation, the switch 42 is closed and the switch 45 is opened. The manner of operation described hereinabove thereby applies to these positions of switches 42 and 45.

For effectively disengaging or rendering inoperative the speed regulation, the cam 52 is rotated through 180° by means of adjusting knob 51 so that instead of switch 42 now switch 45 is closed within the shifting switch 43. The "up" contact pair 28, 28' is thereby effectively bridged by closure of switch 45 so that the relay 37 is energized through line 44 and limit switch 39. Energization of the relay 37 causes energization of the adjusting motor 24 to move the rod in the "up" direction toward the left as viewed in FIGURE 1 to the end position thereof in which the energizing circuit of relay 37 is interrupted by opening of limit switch 39. The pin 22 is disposed exactly in the center of the coupling member 19 in this disengaged position in which the limit switch 39 is opened so that the throttle valve 16 may be actuated by the gas pedal 10 in the usual manner with a 1:1 transmission ratio or with any other correspondingly selected transmission ratio.

The springy abutment 47 enables the driver to overcome without difficulty the adjusted speed value by means of the gas pedal 10, for example, in case of danger. It is therefore possible with an arrangement in accordance with the present invention to accelerate the vehicle by means of the gas pedal 10 without any previous disengagement of the regulating system to a speed above the adjusted limit value.

In the embodiment described hereinabove, the gas pedal 10, if one desires to drive with a constant velocity, has to be maintained in position by the foot of the operator or has to be kept in abutment with the springy abutment 47. In order to further facilitate the handling and operation of the vehicle, a holding magnet may be provided, such holding magnet being of any suitable conventional construction. For that purpose, for example, the bell crank 12 is provided with a segment-like armature for a solenoid. The solenoid may be engaged appropriately by a switch arranged at the dashboard or at the steering column. Normally closed holding switches arranged at the clutch and brake are connected in series in the circuit containing this switch which holding switches open when the respective pedals are touched, and thereby disengage the solenoid so as to cause the armature to drop or be released. The bell crank 12 may be retained by the holding magnet in its respective position and the gas pedal 10 may, therefore, be released. However, it is also possible within the scope of the present invention to construct the springy abutment 47 itself as holding magnet so that the gas pedal 10 upon reaching the abutment 47 is automatically retained thereat.

Figure 2:
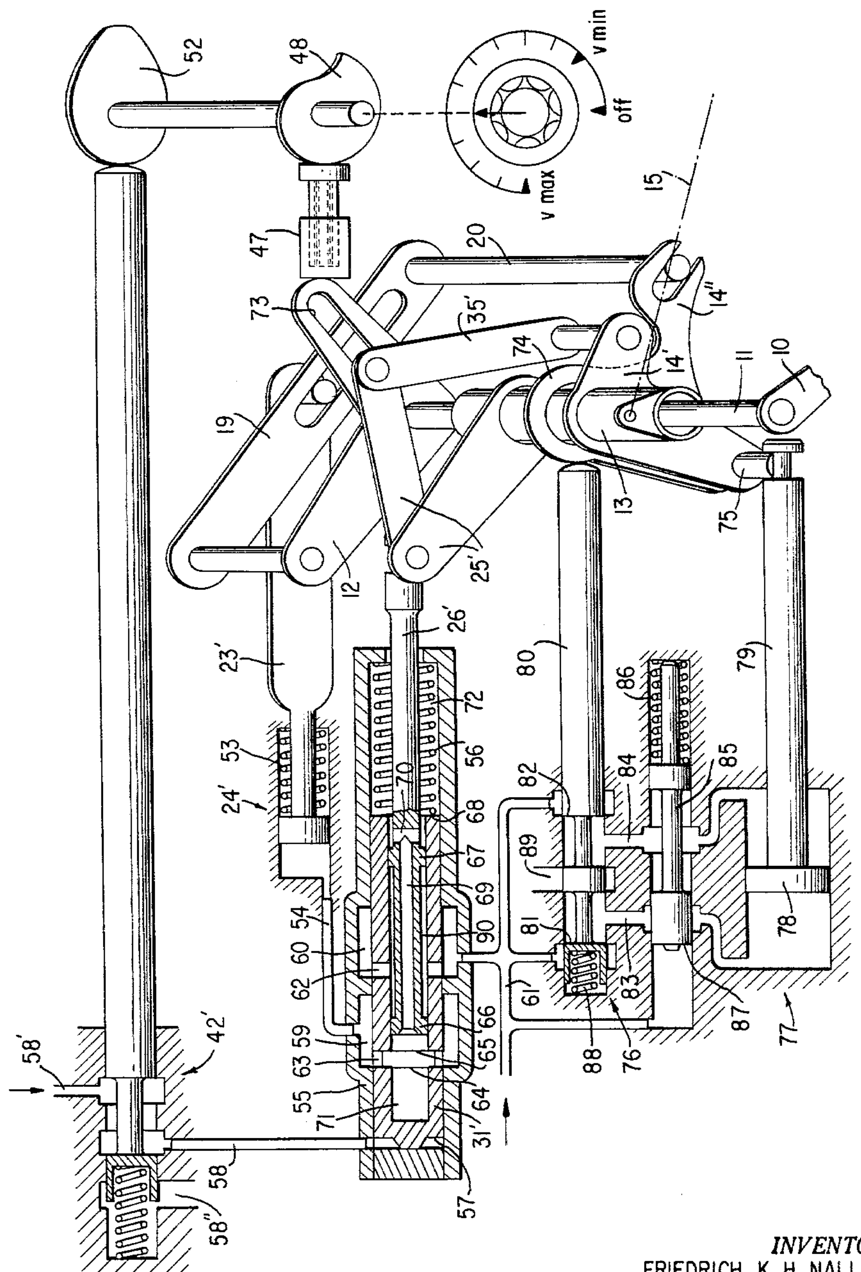
FIGURE 2 is a schematic diagram of a modified embodiment of a speed regulating system in accordance with the present invention utilizing a fluid pressure medium.

FIGURE 2 illustrates a modified embodiment having a construction similar in principle to that of FIGURE 1 for a vehicle having an already available or additional hydraulic pressure medium system. While a hydraulic pressure medium is specifically mentioned herein, it is also understood that instead of the hydraulic pressure medium a pneumatic pressure medium may be used in the present invention. Referring now to FIGURE 2 in which like reference numerals are used again to designate corresponding parts, the sleeve 13 is actuated, in the manner described hereinabove, by gas pedal 10 through shaft 11, bell crank 12, coupling member 19 and rod 20 and thereby actuates through linkage 15 the throttle valve or similar engine control member not illustrated herein. A hydraulic adjusting piston generally designated by reference numeral 24' serves in this embodiment as adjusting motor which engages by means of rod 23' with pin 22 in the coupling member 19. The adjusting piston 24' is spring-loaded, on the one hand, by a spring 53 and, on the other, may be loaded hydraulically through line 54.

A plunger piston 31' located within housing 55 serves as "existing value" transmitter means. This plunger piston 31 is loaded, on the one hand, by a spring 56 and, on the other, on the opposite end face 57 through a line 58 by the regulating pressure continuously regulated in dependence on the vehicle speed. The line 58 leads to the supply line 58' through a disengaging or disconnecting piston generally designated by reference numeral 42' which is adapted to be actuated by the cam 52 in a manner corresponding to the arrangement of FIGURE 1 into the "disengaged" position thereof whereby line 58 is connected with the discharge line 58''. The hydraulic pressure medium is supplied through the supply line 58' and is derived, in any conventional manner, well known in the art, from a system which produces a hydraulic pressure proportional at all times to the driving speed of the vehicle.

A further piston 26' operative as "desired value" transmitter means is arranged within the plunger piston 31'. The housing 55 is provided with two annular grooves 59 and 60 the width of which corresponds to the adjusting range. The line 54 leading to the adjusting piston 24' terminates within the annular groove 59. A line 61 which carries the pump-pressure or another serve-pressure, obtained in any suitable known manner, terminates in the other annular groove 60. Bores 62 are arranged within the plunger piston 31' which establish a communication between the inside of the plunger piston 31' and the annular groove 60. Apertures or cut-out portions 63 serves as connection between the annular groove 59 and the inside of the plunger piston 31' whereby two control edges 64 and 65 are coordinated to the apertures 63.

The inner piston 26' serving as "desired value" transmitter means is provided with two annular projections 66 and 67. The first annular projection 66 is disposed directly adjacent the end face of the piston 26'. The width of the annular projection 66 is approximately equal to the distance between the two control edges 64 and 65. The other annular projection 67 is disposed in proximity to the end 68 of the plunger piston 31'. There is provided within piston 26', starting from one end face thereof, a longitudinal bore 69 and one or several cross bores 70 on the other side of the projection 67. As a result thereof, the space 71 disposed at the left end face of the piston 26' as viewed in FIGURE 2 is connected with the space 72 which is always pressureless, i.e., connected with the discharge.

The actuation of the piston 26' serving as "desired value" transmitter means takes place indirectly through a coupling linkage 25' from the bell crank 12, the coupling linkage 25' being freely rotatably mounted about the sleeve 13. The coupling linkage 25' is at the same time connected with lever 14' secured to the sleeve 13 by the follow-up linkage 35'. Follow-up linkage 35' and coupling linkage 25' are guided within an elongated aperture 73 of the bell crank 12.

A hydraulic servo-member is provided in the embodiment of FIGURE 2 for the actuation of the throttle valve (not shown). For that purpose, the lever 14'' connected with the coupling member 19 through rod 20 is separate from the lever 14' rigidly secured to the sleeve 13, both of these levers being combined into lever 14 in the embodiment of FIGURE 1. The lever 14'' surrounds the sleeve 13 by means of an eye portion with a predetermined play and is rotatable about a pin 75 of the lever 14'.

The servo-assist member consists, on the one hand, of a transmitter generally designated by reference numeral 76 and of an amplifier or servo-mechanism, generally designated by reference numeral 77. The amplifier 77 is a double-acting piston 78 the piston rod 79 of which engages at the pin 75 and thereby adjusts the sleeve 13 and therewith through linkage 15 the throttle valve. The tranmitter 76 is formed by a piston 80 the control edges 81 and 82 of which control the pressure medium supply from the pressure line 61 into one of the two lines 83 and 84 and therewith to one or the other side of the servo piston 78.

A short-circuit or by-pass slide valve 85 is interconnected into the lines 83 and 84 which valve 85 is spring-loaded by a spring 86 and is kept in the position illustrated in FIGURE 2 by the servo pressure supplied thereto from line 61 and acting against the end face 87 thereof. In case of failure of pressure, as contrasted to an intended disengagement of the regulating feature, the spring 86 displaces the slide valve 85 toward the left as viewed in FIGURE 2 so that both lines 83 and 84 are connected with each other. As a result thereof, the amplifier or servo-mechanism 77 is effectively bridged and therewith becomes disengaged, and the throttle valve is thereupon actuated in the usual manner directly by the gas pedal 10.

The actuation of the transmitter means 76 takes place by lever 14''. If the lever 14'' is moved in any direction, by the rod 20, which movement may be initiated either by the control member 23' or the gas pedal, then the lever 14'' at first rotates about the pin 75 depending on the amount of play with respect to the sleeve 13. Such rotation causes movement of the piston 80 of the transmitter means 76 either toward the left or toward the right as a result of the presence of spring 88. If the piston 80 moves toward the left, then the pressure medium flows through line 83 toward the left side of the piston 78 whereas the right side of the piston 78 is connected with the discharge 89 through the line 84. As a result, the servo piston 78 moves toward the right as viewed in FIGURE 2 which causes a closure movement of the throttle valve by pivoting the sleeve 13 in the counter-clockwise direction. If, in contradistinction thereto, the transmitter piston 80 is moved toward the right by the spring 88 with a corresponding downward movement of the lever 14'', then the reverse operation takes place. The servo piston 78 then moves toward the left and the throttle valve is opened.

The operation of the regulating installation and in particular the "existing value" transmitter means and the "desired value" transmitter means of FIGURE 2 is the same, in principle, as in FIGURE 1. The adjusting piston 24' receives through line 54 always a pressure medium when the plunger piston 31' is moved with the control edge 65 thereof toward the right beyond the annular projection 66 of the piston 26' serving as "desired value" transmitter means, which is the case when the vehicle speed exceeds the "desired" value. In this case the pressure medium enters from the pressure line 61 into the annular space 60 and becomes effective through bore 62, annular space 90 formed between pistons 26' and 31', cut-out portions or apertures 63, annular space 59 and line 54 at the left side of adjusting piston 24'. The latter inclusive its piston rod 23' thereupon move toward the right as viewed in FIGURE 2 and displace the throttle valve (not shown) in the closing direction as explained hereinabove.

If the vehicle speed drops below a "desired" value, then the spring 56 forces the plunger piston 31' against the decreasing regulator pressure toward the left until the control edge 64 clears the projection 66. As a result thereof, the line 54 is relieved through aperture 63, bore 71, bore 69, cross bore 70 and discharge 72, and the spring 53 displaces the adjusting piston 24' toward the left which causes an adjustment of the throttle valve in the opening direction as previously explained.

The operation of the disengaging means 52 and of the springy abutment 47 with the adjusting cam 48 is the same as described in connection with FIGURE 1. As in FIGURE 1, a holding magnet or a hydraulic holding mechanism of any suitable conventional construction may be provided in the described or analogous manner to hold the arm of bell crank 12 containing aperture 73 in engagement with abutment 47. However, the servo mechanism remains operative as before.

Figure 3:
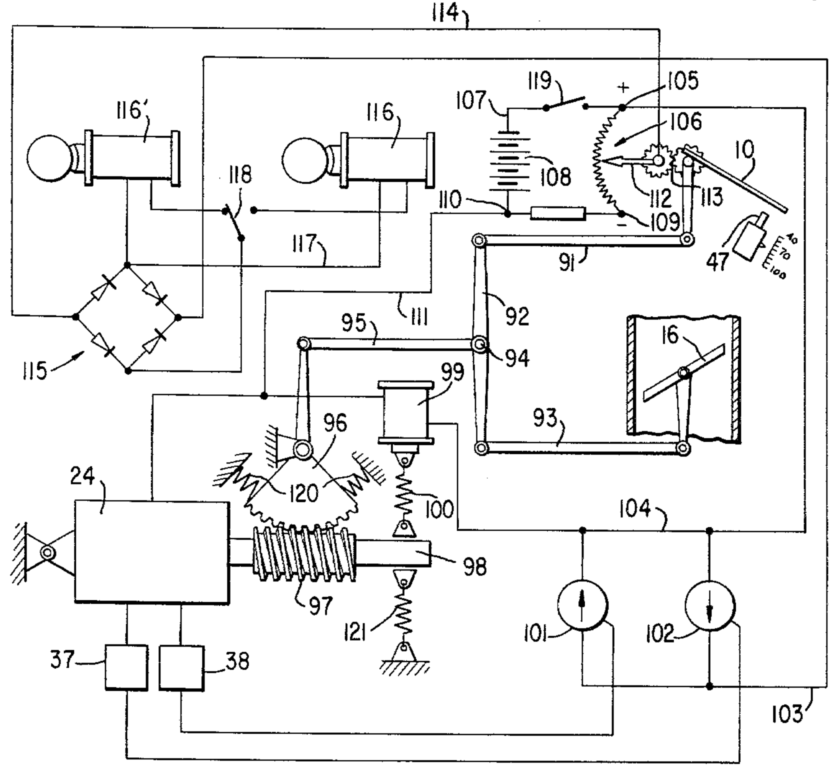
FIGURE 3 is a schematic diagram of a third modified embodiment of a substantially electrically operated speed regulating system in accordance with the present invention.

In the embodiment of FIGURE 3, a scale-beam-like double lever 92 is actuated through a linkage 91 from the gas pedal 10, to which is again operatively coordinated a springy and adjustable abutment 47. The throttle valve 16 is adjusted, in turn, by the other arm of the double lever 92 through a linkage 93 or the like. The center support 94 of the scale beam-like lever 92 is connected through a linkage 95 and a toothed segment 96 with the worm 97 of the adjusting motor 24.

The adjusting motor 24, as in the embodiment of FIGURE 1, is an electric motor of conventional construction adapted to be energized so as to rotate in either direction of rotation. The electric motor 24 is pivotally supported at the housing and the shaft 98 carrying the worm 97 is maintained by means of a resilient member 100 adapted to be loaded by a magnet 99 always in the illustrated position in opposition to the effect of a return spring 121, i.e., the worm 97 is then in operative meshing engagement with the toothed segment 96.

The adjusting motor 24 is again controlled by means of the relays 37 and 38 as in FIGURE 1. A transistor 101 and 102 is disposed in the corresponding energizing circuit of the relays 37 and 38, respectively. Both transistors 101 and 102 are connected to an "existing value" line 103 and to a "desired value" line 104. The "desired value" line 104 is connected with the terminal 105 of a regulating potentiometer generally designated by reference numeral 106 and through the main switch 119 with the positive terminal 107 of the vehicle battery 108. The other terminal 109 of the potentiometer 106 is connected with the negative terminal 110 of the battery 108, a line 111 simultaneously connecting the negative terminal 110 of the battery 108 with the adjusting motor 24 and the holding magnet 99 for the motor 24.

The transistors 101 and 102 are provided exclusively as control devices and are so connected that with a current flow from the "desired value" line 104 to the "existing value" line 103 one transistor and with a reverse current flow the other transistor responds and produces a pulse applied to the corresponding relay 37 or 38. With the use of power transistors, of course, the relays 37 and 38 may be dispensed with altogether so that the transistors 101 and 102 act directly on the energizing windings of the adjusting motor 24.

The center arm 112 of the potentiometer 106 is adjustable through a gear wheel drive 113 or the like from the gas pedal 10. The variable control resistance 106 is operative as potentiometer. A line 114 leads from the center arm 112 through a rectifier generally designated by reference numeral 115 to two speed transmitter means 116 and 116' constructed in the manner of generators or dynamos. The transmitter 116 is thereby dependent on the speed of the vehicle. The "existing value' line 103 is supplied through a line 117 from the transmitter 116 through the same rectifier 115.

The other transmitter 116' is responsive to the engine rotational speed and serves for purposes of idling speed regulation. Either one or the other of the transmitters 116 and 116' may be selectively connected through a switch 118 with the "existing value" line 103 for purposes of feeding the same. The switch 118 is appropriately actuated automatically, for example, by the tachometer of the vehicle in a conventional manner, not illustrated herein, so as to actuate the switch 118 at a predetermined speed, for example, at the 20 kilometers per hour speed. The switch 118 is thereby so constructed and arranged that below this minimum speed of the idling speed transmitter 116' and above this speed the vehicle speed regulator 116 is rendered effective.

*Operation*

The operation of the electric regulating installation described hereinabove which may also be constructed in a manner corresponding to FIGURE 1 or FIGURE 2 as regards the linkage between gas pedal, transmitter means, adjusting member and throttle valve, is the same in principle as in the embodiments of FIGURES 1 and 2.

There is compared in the embodiment of FIGURE 3 a "desired" voltage magnitude predetermined by the setting of the gas pedal 10 with the "existing" voltage magnitude dependent on the speed of the vehicle. If a voltage difference exists in such a manner that a current flow from the "existing value" line 103 to the "desired value" line 104 takes place which is the case when the vehicle speed lies above the desired speed, then the transistor 101 produces a pulse for the relay 38 which is thereby energized and the adjusting motor 24 rotates in a "down" direction and adjusts through the worm wheel drive 97, 96 and the linkage 95, 92 and 93 the throttle valve 16 in the closing direction.

If, in contradistinction thereto, the voltage difference is such that the current flow takes place from the "desired value" line 104 to the "existing value" line 103 which is the case when the vehicle lags behind the desired speed, then the transistor 102 responds and produces a control pulse for the other relay 37 thereby energizing the latter. As a result, thereof, the adjusting motor 24 now adjusts the throttle valve 16 in an analogous manner in the opening direction thereof.

When there is a current failure in the electrical system or upon opening of the main switch 119, the magnet 99 becomes de-energized and the spring 121 now pulls the shaft 98 of the adjusting motor 24 for such a distance that the worm 97 is effectively disengaged from the toothed segment 96. The toothed segment 96 is now returned by the two springs 120 into the center position thereof. The throttle valve 16 may now be actuated in the usual manner from the gas pedal 10 whereby the scale-beam-like lever 92 rotates about its center point 94 as the relatively stationary point of rotation.

Figure 4:
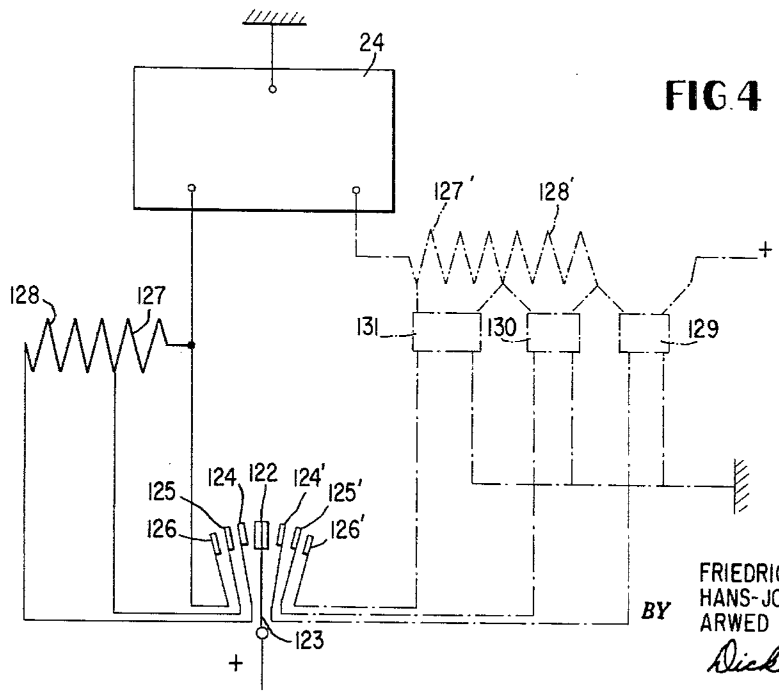
FIGURE 4 is a partial diagrammatic view of a modified embodiment of certain details adapted to be used in the regulating system of FIGURE 1.

In the embodiment of FIGURE 4, several contacts 124, 125 and 126 provided at the "desired value" transmitter means are coordinated to the contact 122 of the "existing value" transmitter means 123 corresponding to the arrangement of FIGURE 1. The contacts 124, 125 and 126 as well as the contacts 124', 125' and 126' are constructed in a springy or resilient manner. The contact 126 is connected directly with the energizing coil of the adjusting motor 24 whereas the contacts 125 and 124 are each connected with the energizing coil of the adjusting motor 124 through resistances 127 and 128, respectively. With a relatively slight speed deviation or speed difference, only contacts 122 and 124 come into contact with each other. Both resistances 127 and 128 are now effective and the adjusting motor 24 thereby rotates relatively slowly. With a larger deviation or deflection, contact is also made with the contact 125. As a result thereof, the resistance 128 is short-circuited and only the resistance 127 remains in the energizing circuit for the winding of the adjusting motor 24. Consequently, the adjusting motor 24 rotates more rapidly. With an even larger deviation or deflection, contact is made also with the contact 126 so that both resistances 127 and 128 are now short-circuited and the adjusting motor 124 reaches its maximum rotational speed.

In this manner, not only the tendency but also the magnitude of the deviation is considered in the regulating system of the present invention. Of course, the arrangement described so far hereinabove in connection with FIGURE 4 is also provided for the other side of the transmitter means in an analogous manner. While the other side may be made in an identical manner, FIGURE 4 illustrates an indirect control of the resistances 127' and 128' through relays 129, 130 and 131 which in turn may also be provided, if so desired, with the resistances 127 and 128. However, the operation of such controls are identical. It is obvious that the arrangement of FIGURE 4 may be readily utilized with a system illustrated in FIGURE 1 whereby the contact 122 takes the place of contacts 28', 29' and contacts 124, 125 and 126 take the place of contact 28 whereas contacts 124', 125' and 126' take the place of contact 29.

Figure 5:
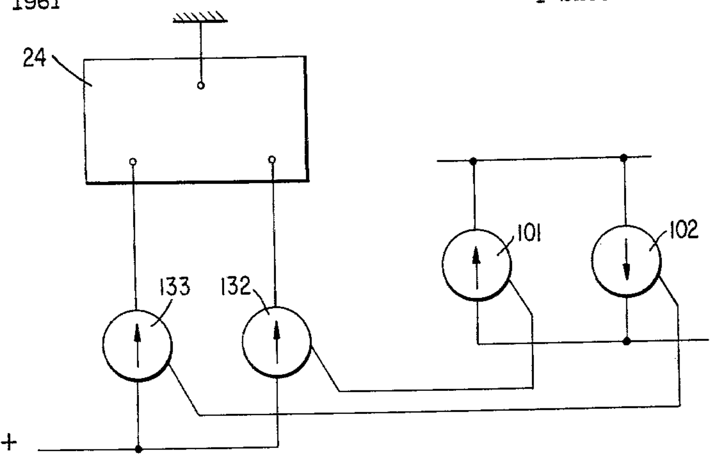
FIGURE 5 is a schematic diagram of a modified embodiment of certain details adapted to be used in a speed regulating system of FIGURE 3.

In principle, of course, similar measures as those outlined in FIGURE 4 may also be taken in connection with the other embodiments of FIGURES 2 and 3 described hereinabove to obtain analogous control results. Insofar as, for example, power transistors are used in the embodiment of FIGURE 3, the magnitude of the deviation is automatically taken into consideration with such an arrangement. However, it is also possible to utilize a system illustrated in FIGURE 5 in which the transistors 101 and 102 control the power transistors 132 and 133 which in turn are directly connected into the energizing circuits of the adjusting motor 24. Of course, it would also be possible to switch in and out resistances such as illustrated in FIGURE 4 by means of transistors 101 and 102 through several relays.

In the embodiment of FIGURE 2, this inventive concept could be realized in such a manner that the magnitude of the deviation between the "existing value" piston and the "desired value" piston is sensed by a spring member and the energizing circuits are controlled from this springy member either directly or indirectly through resistances or the like.

In the embodiment of FIGURE 6, an arm 134 is secured to the shaft 11 connected with the gas pedal (not illustrated). A similar arm 135 is mounted on a shaft 136 which is operatively connected with the throttle valve (not shown) and is arranged coaxially to or aligned with shaft 11. Both arms 134 and 135 are provided at the free end thereof with a slot 137 and 138, respectively. A two-armed lever 139 engages with the arm 135 which lever 139 is rotatably supported at the housing or at a relatively fixed part. The coupling member 19 engages with the arm 134 which coupling member is supported, in the manner already described hereinabove, with an elongated aperture 21 on the pin 22 of the adjusting member 23. The coupling member 19 and the lever 139 are connected with each other at their respective ends by means of a pin 140 or the like. This linkage system illustrated in FIGURE 6 is extremely simple. It is operative in the same manner as described in connection with the linkage of FIGURE 1.

With relatively steep upward and downward inclines of the road, the described regulation may not be sufficient any longer under certain circumstances to maintain the desired vehicle speed. The change-speed transmission shifting system has to be included or interconnected now within the speed regulating system, at least in the sense of a shifting-back operation to lower speeds. According to FIGURE 7, one contact 124 and 124' each at the "desired value" transmitter means is coordinated for that purpose to the contact 122 of the "existing value" transmitter means 123 by means of which, in the manner described in connection with FIGURE 1, the adjusting motor 24 is controlled for displacement of the adjusting member 23 in either direction. Furthermore, in a manner similar to the arrangement of FIGURE 4, further contacts 141 and 141' are provided which, with a stronger deflection corresponding to a larger deviation between "existing" and "desired" velocity, come into abutment and effect through lines 142 a shifting back within the change-speed transmission 143. The shifting back operation, i.e., the engagement of a lower speed, may take place in any conventional manner. The shifting system for the change-speed transmission may thereby be a selectively operable electrically controlled shifting system into which the lines 142 are operatively connected.

The inventive concept may be further extended and refined by providing, in a manner analogous to FIGURE 4, on each side of an "existing value" transmitter means several contacts arranged one behind the other which become effective sequentially and by means of which the individual speeds are successively engaged during a shifting back operation. This takes place in an identical manner on both sides of the contact arrangement, i.e., both with an ascending and descending road, the transmission 143 is shifted back, speed by speed, until the preselected velocity can be maintained. However, blocking or delay means of any conventional construction, for example, in lines 142 may be provided which permit a shifting back operation to become effective only when the normal regulating range at the throttle valve 16 has been exhausted.

A further development of the present invention also provides for the actuation of the brake 146 in case of very steep roads. There is provided for that purpose in FIGURE 7 on the "down" side of the transmitter means a further contact 144 which actuates through a servo motor 145 of suitable construction the brake 146. This actuation as well as the aforementioned engagement of the transmission shifting operation takes place in a manner adapted to the respective transmission and brake constructions.

While we have shown and described several embodiments in accordance with the present invention, it is understood that the same is not limited thereto but is susceptible of many changes and modifications within the spirit and scope of the present invention, and we therefore do not wish to be limited to the details shown and described herein but intend to cover all such changes and modifications as are encompassed by the scope of the appended claims.

We claim:

1. Apparatus for the automatic regulation of the vehicle speed of engine-driven vehicles, especially motor vehicles, having an engine provided with engine control means, comprising first transmitter means for producing a first control magnitude representative of a pre-selected desired vehicle speed, second transmitter means for producing a second control magnitude representative of the existing vehicle speed, comparing means for comparing with each other said two control magnitudes and for producing a control effect in response to any deviation therebetween, adjusting means operatively connected with said control means for selectively adjusting said control means, first connecting means operatively connecting said comparing means with said adjusting means for rendering operative said adjusting means in dependence on said control effect produced by the deviation between said magnitudes, a single driver-operated actuating means for selectively adjusting said engine control means and operable simultaneously therewith to preselect the desired vehicle speed, and second connecting means operatively connecting said actuating means with said first transmitter means in such a manner that said desired value is preselected by the respective position of said actuating means.

2. Apparatus for the automatic regulation of the vehicle speed of engine-driven vehicles, especially motor vehicles, having an engine provided with engine control means, comprising first transmitter means for producing a first control magnitude representative of a preselected desired vehicle speed, second transmitter means for producing a second control magnitude representative of the existing vehicle speed, comparing means for comparing with each other said two values and for producing a control effect in response to any deviation therebetween, adjusting means for selectively adjusting said control means, first connecting means operatively connecting said comparing means with said adjusting means for rendering operative said adjusting means in dependence on said control effect produced by the deviation between said values, a single driver-operated actuating means, second connecting means operatively connecting said actuating means with said engine control means for selectively adjusting said engine control means and effectively providing a variable transmission ratio between said actuating means and said engine control means, third connecting means operatively connecting said actuating means with said first transmitter means in such a manner that said desired value is preselected by the respective position of said actuating means, and fourth connecting means operatively connecting said adjusting means with said control means in such a manner as to effectively vary the transmission ratio provided by said second connecting means.

3. Apparatus for the automatic regulation of the vehicle speed of engine-driven vehicles, especially motor vehicles, having an engine provided with engine control means, comprising first transmitter means for producing a first control magnitude representative of a preselected desired vehicle speed, second transmitter means for producing a second control magnitude representative of the existing vehicle speed, comparing means for comparing with each other said two values and for producing a control effect in response to any deviation therebetween, adjusting means for selectively adjusting said control means, first connecting means operatively connecting said comparing means with said adjusting means for rendering operative said adjusting means in dependence on said control effect produced by the deviation between said values, a single driver-operated actuating means, second connecting means operatively connecting said actuating means with said engine control means for selectively adjusting said engine control means and effectively providing a variable transmission ratio between said actuating means and said engine control means, third connecting means operatively connecting said actuating means with said first transmitter means in such a manner that said desired value is preselected by the respective position of said actuating means, and fourth connecting means operatively connecting said adjusting means with said control means in such a manner as to effectively vary the transmission ratio provided by said second connecting means, the possible path of said actuating means being coordinated to the possible vehicle speed at least approximately linearly.

4. Apparatus for the automatic regulation of the vehicle speed of engine-driven vehicles, especially motor vehicles, having an engine provided with engine control means, comprising first transmitter means for producing a first control magnitude representative of a preselected desired vehicle speed, second transmitter means for producing a second control magnitude representative of the existing vehicle speed, comparing means for comparing with each other said two values and for producing a control effect in response to any deviation therebetween, adjusting means including an adjusting motor for selectively adjusting said control means, first connecting means operatively connecting said comparing means with said adjusting means for rendering operative said adjusting means in dependence on said control effect produced by the deviation between said values including speed-control means for controlling the speed of said adjusting motor in dependence on the magnitude of said deviation in such a manner that the adjusting speed thereof increases with an increase in deviation, a single driver-operated actuating means, second connecting means operatively connecting said actuating means with said engine control means for selectively adjusting said engine control means and effectively providing a variable transmission ratio between said actuating means and said engine control means, third connecting means operatively connecting said actuating means with said first transmitter means in such a manner that said desired value is preselected by the respective position of said actuating means, and fourth connecting means operatively connecting said adjusting means with said control means in such a manner as to effectively vary the transmission ratio provided by said second connecting means.

5. An apparatus as defined in claim 4, wherein said speed-control means includes means for controlling the speed of said adjusting motor in a step-like manner in dependence on the magnitude of said deviation.

6. An apparatus as defined in claim 4, wherein said speed-control means includes means for controlling the speed of said adjusting motor in a continuous manner in dependence on the magnitude of said deviation.

7. Apparatus for the automatic regulation of the vehicle speed of engine-driven vehicles, especially motor vehicles, having an engine provided with engine control means, comprising first transmitter means for producing a first control magnitude representative of a preselected desired vehicle speed, second transmitter means for producing a second control magnitude representative of the existing vehicle speed, comparing means for comparing with each other said two values and for producing a control effect in response to any deviation therebetween including means for determining the tendency of said deviation and the magnitude thereof, adjusting means for selectively adjusting said control means including an adjusting motor, first connecting means operatively connecting said comparing means with said adjusting means for rendering operative said adjusting means in dependence on said control effect produced by the deviation between said values in such a manner that the direction of rotation of said adjusting motor is determined by the tendency of said deviation and the adjusting speed thereof is determined by the magnitude of said deviation, a single driver-operated actuating means, second connecting means operatively connecting said actuating means with said engine control means for selectively adjusting said engine control means and effectively providing a variable transmission ratio between said actuating means and said engine control means, third connecting means operatively connecting said actuating means with said first transmitter means in such a manner that said desired value is preselected by the respective position of said actuating means, and fourth connecting means operatively connecting said adjusting means with said control means in such a manner as to effectively vary the transmission ratio provided by said second connecting means.

8. Apparatus for the automatic regulation of the vehicle speed of engine-driven vehicles, especially motor vehicles, having an engine provided with engine control means and a change-speed transmission provided with shifting means to engage the different speeds thereof, comprising first transmitter means for producing a first control magnitude representative of a preselected desired vehicle speed, second transmitter means for producing a second control magnitude representative of the existing vehicle speed, comparing means for comparing with each other said two values and for producing a control effect in response to any deviation therebetween including means for determining the tendency of said deviation and the magnitude thereof, adjusting means for selectively adjusting said control means including an adjusting motor and an adjusting member, first connecting means operatively connecting said comparing means with said adjusting means for rendering operative said adjusting means in dependence on said control effect produced by the deviation between said values in such a manner that the direction of rotation of said adjusting motor is determined by the tendency of said deviation and the adjusting speed thereof is determined by the magnitude of said deviation, driver-operated actuating means, second connecting means operatively connecting said actuating means with said engine control means for selectively adjusting said engine control means and effectively providing a variable transmission ratio between said actuating means and said engine control means, third connecting means operatively connecting said actuatig means with said first transmitter means in such a manner that said desired value is preselected by the respective position of said actuating means, fourth connecting means operatively connecting said adjusting means with said control means in such a manner as to effectively vary the transmission ratio provided by said second connecting means, and fifth connecting means operatively connecting said comparing means with said shifting means in such a manner that said shifting means is rendered effectual to shift back said change-speed transmission to a lower speed in dependence on said deviation.

9. Apparatus for the automatic regulation of the vehicle speed of engine-driven vehicles, especially motor vehicles, having an engine provided with engine control means and a change-speed transmission provided with shifting means to engage the different speeds thereof, comprising first transmitter means for producing a first control magnitude representative of a preselected desired vehicle speed, second transmitter means for producing a second control magnitude representative of the existing vehicle speed, comparing means for comparing with each other said two values and for producing a control effect in response to any deviation therebetween including means for determining the tendency of said deviation and the magnitude thereof, adjusting means for selectively adjusting said control means including an adjusting motor and an adjusting member, first connecting means operatively connecting said comparing means with said adjusting means for rendering operative said adjusting means in dependence on said control effect produced by the deviation between said values in such a manner that the direction of rotation of said adjusting motor is determined by the tendency of said deviation and the adjusting speed thereof is determined by the magnitude of said deviation, driver-operated actuating means, second connecting means operatively connecting said actuating means with said engine control means for selectively adjusting said engine control means and effectively providing a variable transmission ratio between said actuating means and said engine control means, third connecting means operatively connecting said actuating means with said first transmitter means in such a manner that said desired value is preselected by the respective position of said actuating means and fourth connecting means operatively connecting said adjusting means with said control means in such a manner as to effectively vary the transmission ratio provided by said second connecting means, and fifth connecting means operatively connecting said comparing means with said shifting means in such a manner that said shifting means is rendered effectual to shift back said change-speed transmission to a lower speed in dependence on said deviation including delay means for delaying such shifting back operation until one of the parts consisting of said control means, said adjusting motor and said adjusting member reaches one of the end positions thereof.

10. An apparatus as defined in claim 9 wherein the magnitude of said deviation alone and independently of said tendency is operative to produce the shifting operations.

11. Apparatus for the automatic regulation of the vehicle speed of engine-driven vehicles, especially motor vehicles, having an engine provided with engine control means, comprising first transmitter means for producing a first control magnitude representative of a pre-selected desired vehicle speed, second transmitter means for producing a second control magnitude representative of the existing vehicle speed, comparing means for comparing with each other said two control magnitudes and for producing a control effect in response to any deviation therebetween, adjusting means operatively connected with said control means for selectively adjusting said control means, first connecting means operatively connecting said comparing means with said adjusting means for rendering operative said adjusting means in dependence on said control effect produced by the deviation between said magnitudes, a single driver-operated actuating means for selectively adjusting said engine control means and operable simultaneously with the engine control adjustment for preselecting the desired vehicle speed, abutment means for effectively stopping said actuating means in a position thereof corresponding to the desired vehicle speed to limit the vehicle speed to said desired speed, and second connecting means operatively connecting said actuating means with said first transmitter means in such a manner that said desired value is preselected by the respective position of said actuating means.

12. Apparatus for the automatic regulation of the vehicle speed of engine-driven vehicles, especially motor vehicles, having an engine provided with engine control means, comprising first transmitter means for producing a first control magnitude representative of a preselected desired vehicle speed, second transmitter means for producing a second control magnitude representative of the existing vehicle speed, comparing means for comparing with each other said two control magnitudes and for producing a control effect in response to any deviation therebetween adjusting means operatively connected with said control means for selectively adjusting said control means, first connecting means operatively connecting said comparing means with said adjusting means for rendering operative said adjusting means in dependence on said control effect produced by the deviation between said magnitudes, a single driver-operated actuating means for selectively adjusting said engine control means and operable simultaneously with the engine control adjustment for preselecting the desired vehicle speed, abutment means for effectively stopping said actuating means in a position thereof corresponding to the desired vehicle speed to limit the vehicle speed to said desired speed, means for selectively adjusting said abutment means into a plurality of positions thereof to thereby effectively vary the vehicle speed limit, and second connecting means operatively connecting said actuating means with said first transmitter means in such a manner that said desired value is preselected by the respective position of said actuating means.

13. A system for the automatic regulation of the driving speed of a motor vehicle provided with an engine having an engine control member, with first means for producing a control magnitude for the desired vehicle velocity and with second means for producing a control magnitude corresponding to the prevailing speed, comprising actuating means including an actuating member operatively connected with said control member, comparing means for comparing said magnitudes with each other and producing a control effect operative to adjust the control member of the engine, and preselecting means for preselecting the desired value by the respective position of said actuating member, and means for rendering the automatic speed regulation inoperative below a predetermined substantially fixed minimum speed by preventing said second means from assuming a position corresponding to a speed below said minimum speed.

14. A regulating system for automatically regulating the driving speed of engine-driven vehicles, especially motor vehicles, comprising first means for producing a magnitude corresponding to the desired vehicle speed, second means for producing a magnitude corresponding to the prevailing vehicle speed, engine control means, comparing means for comparing said two magnitudes derived from said first and second means and for producing a control effect operative to selectively adjust said engine control means in respone to any deviation between said two magnitudes, a single driver-operated actuating means, means operatively connecting said driver actuated means with said control means for selectively adjusting said control means to any desired position including means for preselecting by the position of said actuating means the magnitude produced by said first means so as to correspond to said desired velocity.

15. Apparatus for the automatic regulation of the vehicle speed of engine-driven vehicles, especially motor vehicles, having vehicle brake means, an engine provided with engine control means and a change-speed transmission with engageable means to engage the different speeds thereof, comprising first transmitter means for producing a first control magnitude representative of a preselected desired vehicle speed, second transmitter means for producing a second control magnitude representative of the existing vehicle speed, comparing means for comparing with each other said two control magnitudes including means for producing control effects in response to the tendency and magnitude of the deviation therebetween, adjusting means operatively connected with said control means for selectively adjusting said control means, first connecting means operatively connecting said comparing means with said adjusting means for rendering operative said adjusting means in dependence on the control effects produced by the deviation between said magnitudes including means for controlling the speed of said adjusting means in dependence on the magnitude of said deviation, driver-operated actuating means for selectively adjusting said engine control means, means operatively connected with said engageable means and with said comparing means for automatically shifting to a lower speed in said transmission during occurrence of a deviation of predetermined magnitude, and second connecting means operatively connecting said actuating means with said first transmitter means in such a manner that said desired value is preselected by the respective position of said actuating means.

16. Apparatus for the automatic regulation of the vehicle speed of engine-driven vehicles, especially motor vehicles, having vehicle brake means, an engine provided with engine control means and a change-speed transmission provided with shifting means to engage the different speeds thereof, comprising first transmitter means for producing a first control magnitude representative of a preselected desired vehicle speed, second transmitter means for producing a second control magnitude representative of the existing vehicle speed, comparing means for comparing with each other said two values and for producing a control effect in response to any deviation therebetween including means for determining the tendency of said deviation and the magnitude thereof, adjusting means for selectively adjusting said control means including an adjusting motor and an adjusting member, first connecting means operatively connecting said comparing means with said adjusting means for rendering operative said adjusting means in dependence on said control effect produced by the deviation between said values in such a manner that the direction of rotation of said adjusting motor is determined by the tendency of said deviation and the adjusting speed thereof is determined by the magnitude of said deviation, driver-operated actuating means, second connecting means operatively connecting said actuating means with said engine control means for selectively adjusting said engine control means and effectively providing a variable transmission ratio between said actuating means and said engine control means, third connecting means operatively connecting said actuating means with said first transmitter means in such a manner that said desired value is preselected by the respective position of said actuating means, fourth connecting means operatively connecting said adjusting means with said control means in such a manner as to effectively vary the transmission ratio provided by said second connecting means, and fifth connecting means operatively connecting said comparing means with said shifting means and with said brake means in such a manner that said shifting means is rendered effectual to shift back said change-speed transmission to a lower speed and said vehicle brake means is engaged in dependence on the magnitude of said deviation including delay means for delaying such shifting back operation until one of the parts consisting of said control means, said adjusting motor and said adjusting member reaches one of the end positions thereof.

17. Apparatus for the automatic regulation of the vehicle speed of engine-driven vehicles, especially motor vehicles, having an engine provided with engine control means, comprising measuring means operative according to the tachometer principle for producing a control magnitude representative of the existing vehicle speed including a shaft and arm means provided with adjustable contact means, transmitter means for producing a control magnitude representative of a preselected desired speed including double-armed lever means rotatable about said shaft and provided with adjustable contact means, the contact means of one of the two parts consisting of said arm means and said double-armed lever means enclosing therebetween the contact means of the other of said two parts, comparing means including said contact means for comparing with each other said two control magnitudes and for producing a control effect in response to any deviation therebetween, adjusting means operatively connected with said engine control means for selectively adjusting said engine control means, first connecting means operatively connecting said comparing means with said adjusting means for rendering operative said adjusting means in dependence on said control effect produced by the deviation between said magnitudes, driver-operated actuating means for selectively adjusting said engine control means, and second connecting means operatively connecting said actuating means with said first transmitter means in such a manner that said desired speed is preselected by the respective position of said actuating means, and pretensioned spring means connected to said arm means and being effective to prevent said arm means from assuming a position corresponding to a speed below a substantially fixed minimum speed.

18. Apparatus for the automatic regulation of the vehicle speed of engine-driven vehicles, especially motor vehicles, having an engine provided with engine control means, comprising measuring means operative according to the tachometer principle for producing a control magnitude representative of the existing vehicle speed including a shaft and arm means provided with adjustable contact means, transmitter means for producing a control magnitude representative of a preselected desired speed including double-armed lever means rotatable about said shaft and provided with adjustable contact means, the contact means of one of the two parts consisting of said arm means and said double-armed lever means enclosing therebetween the contact means of the other of said two parts and said contact means being operative as selector switch means corresponding to the tendency of the deviation between said two magnitudes, comparing means including said contact means for comparing with each other said two control magnitudes and for producing control effects in response to any deviation therebetween, adjusting means operatively connected with said engine control means for selectively adjusting said engine control means including a reversible electric motor, an adjusting member and screw-like connecting means operatively connecting said motor with said adjusting member to longitudinally displace the latter upon rotation of the former, first connecting means operatively connecting said comparing means with said adjusting means for rendering operative said adjusting means in dependence on said control effect produced by the deviation between said magnitudes including two energizing circuits for said motor each energizing circuit including two contact means, one from each of said two parts and in series therewith a limit switch automatically actuated by said adjusting member, driver-operated actuating means for selectively adjusting said engine control means, and second connecting means operatively connecting said actuating means with said first transmitter means in such a manner that said desired speed is preselected by the respective position of said actuating means, and means connected to said arm means for preventing said arm means from assuming a position corresponding to a speed below a substantially fixed minimum speed.

19. Apparatus for the automatic regulation of the vehicle speed of engine-driven vehicles, especially motor vehicles, having an engine provided with engine control means, comprising measuring means operative according to the tachometer principle for producing a control magnitude representative of the existing vehicle speed including a shaft and arm means provided with adjustable contact means, transmitter means for producing a control magnitude representative of a preselected desired speed including double-armed lever means rotatable about said shaft and provided with adjustable contact means, the contact means of one of the two parts consisting of said arm means and said double-armed lever means enclosing therebetween the contact means of the other of said two parts and said contact means being operative as selector switch means corresponding to the tendency of the deviation between said two magnitudes, the contact means at one of the measuring means and transmitter means including a plurality of contacts arranged one behind the other, comparing means including said contact means for comparing with each other said two control magnitudes and for producing control effects in response to any deviation therebetween, adjusting means operatively connected with said engine control means for selectively adjusting said engine control means including a reversible electric motor, an adjusting member and screw-like connecting means operatively connecting said motor with said adjusting member to longitudinally displace the latter upon rotation of the former, first connecting means operatively connecting said comparing means with said adjusting means for rendering operative said adjusting means in dependence on said control effect produced by the deviation between said magnitudes including two energizing circuits for said motor each energizing circuit including two contact means, one from each of said two parts and in series therewith a limit switch automatically actuated by said adjusting member, each of the contacts of the contact means at said one of said measuring and transmitter means being operatively connected with the respective energizing circuit through a resistor of effectively different ohmic value, driver-operated actuating means for selectively adjusting said engine control means, and second connecting means operatively connecting said actuating means with said first transmitter means in such a manner that said desired speed is preselected by the respective position of said actuating means, and spring means operatively connected to said arm means and preventing said arm means from assuming a position corresponding to a speed below a substantially fixed minimum speed.

20. Apparatus for the automatic regulation of the vehicle speed of engine-driven vehicles, especially motor vehicles, having an engine provided with engine control means, comprising measuring means operative according to the tachometer principle for producing a control magnitude representative of the existing vehicle speed including a shaft and arm means provided with adjustable contact means, transmitter means for producing a control magnitude representative of a preselected desired speed including double-armed lever means rotatable about said shaft and provided with adjustable contact means, the contact means of one of the two parts consisting of said arm means and said double-armed lever means enclosing therebetween the contact means of the other of said two parts, comparing means including said contact means for comparing with each other said two control magnitudes and for producing a control effect in response to any deviation therebetween, adjusting means operatively connected with said engine control means for selectively adjusting said engine control means including a variable-speed reversible motor, first connecting means including a plurality of energizing circuits for said motor operatively connecting said comparing means with said motor and selector switch means having a plurality of variable resistors for applying a continuously variable voltage to said motor for the speed control thereof in dependence on the magnitude of said deviation, driver-operated actuating means for selectively adjusting said engine control means, and second connecting means operatively connecting said actuating means with said first transmitter means in such a manner that said desired value is preselected by the respective position of said actuating means.

21. Apparatus for the automatic regulation of the vehicle speed of engine-driven vehicles, especially motor vehicles, having an engine provided with engine control means, comprising measuring means operative according to the tachometer principle for producing a control magnitude representative of the existing vehicle speed including a shaft and arm means provided with adjustable contact means, transmitter means for producing a control magnitude representative of a preselected desired speed including double-armed lever means rotatable about said shaft and provided with adjustable contact means, the contact means of one of the two parts consisting of said arm means and said double-armed lever means enclosing therebetween the contact means of the other of said two parts, comparing means including said contact means for comparing with each other said two control magnitudes and for producing a control effect in response to any deviation therebetween, adjusting means operatively connected with said control means for selectively adjusting said control means including an electric motor adapted to rotate in either direction of rotation, first connecting means operatively connecting said comparing means with said adjusting means for rendering operative said adjusting means in dependence on said control effect produced by the deviation between said magnitudes including at least two energizing circuits each provided with a limit switch and a disengaging switch common to both of said energizing circuits, said disengaging switch being provided with a by-pass switch disposed in parallel with the pair of contact means which upon closure thereof energize the adjusting motor in the direction producing an increase in speed, said by-pass switch being in parallel with a respective limit switch and being closed upon opening of said disengaging switch, driver-operated actuating means for selectively adjusting said engine control means, and second connecting means operatively connecting said actuating means with said first transmitter means in such a manner that said desired value is preselected by the respective position of said actuating means, and spring means operatively connected to said arm means for preventing said arm means from assuming a position corresponding to a speed below a substantially fixed minimum speed.

22. Apparatus for the automatic regulation of the vehicle speed of engine-driven vehicles, especially motor vehicles, having an engine provided with engine control means and a pressure fluid system of which the fluid pressure is controlled continuously in dependence on the vehicle speed, comprising driver-operated actuating means for selectively adjusting said engine control means, first means for producing a control magnitude representative of the existing vehicle speed including first spring-loaded piston means loaded by said pressure fluid and movable against a spring force, second means for producing a control magnitude representative of a preselected desired vehicle speed including second piston means operatively connected with said driver-operated actuating means, each of said piston means being provided with control means effectively valving the pressure fluid of said system, pressure-fluid operated adjusting means operatively connected with said engine control means for selectively adjusting said engine control means, means including the control means of said piston means for effectively comparing said two control magnitudes with each other and thereby produce a control effect on said pressure fluid system, connecting means operatively connecting said comparing means with said adjusting means for blocking the path of said pressure fluid in case of coincidence of the control means of said two piston means and for opening said path in case of non-coincidence therebetween, and further connecting means operatively connecting said actuating means with said second means in such a manner that said second control magnitude and therewith said desired speed is at all times preselected by the respective position of said actuating means.

23. Apparatus for the automatic regulation of the vehicle speed of engine-driven vehicles, especially motor vehicles, having an engine provided with engine control means and a pressure fluid system of which the fluid pressure is controlled continuously in dependence on the vehicle speed, comprising driver-operated actuating means for selectively adjusting said engine control means, first means for producing a control magnitude representative of the existing vehicle speed including first spring-loaded piston means loaded by said pressure fluid and movable against a spring force, second means for producing a control magnitude representative of a preselected desired vehicle speed including second piston means operatively connected with said driver-operated actuating means, each of said piston means being provided with control means effectively valving the pressure fluid of said system, pressure-fluid operated adjusting means operatively connected with said engine control means for selectively adjusting said engine control means including a spring-loaded piston member adapted to be loaded on one side thereof by said fluid pressure to displace said piston member against the spring force in the longitudinal direction thereof, means including the control means of said piston means for effectively comparing said two control magnitudes with each other and thereby produce a control effect on said pressure fluid system, connecting means operatively connecting said comparing means with said adjusting means for blocking the path of said pressure fluid in case of coincidence of the control means of said two piston means and for opening said path in case of non-coincidence therebetween, and further connecting means operatively connecting said actuating means with said second means in such a manner that said second control magnitude and therewith said desired speed is preselected at all times by the respective position of said actuating means.

24. Apparatus for the automatic regulation of the vehicle speed of engine-driven vehicles, especially motor vehicles, having an engine provided with engine control means and a pressure fluid system with a pressure supply of which the fluid pressure is controlled continuously in dependence on the vehicle speed, comprising driver-operated actuating means for selectively adjusting said engine control means, first means for producing a control magnitude representative of the existing vehicle speed including first spring-loaded piston means constructed as plunger piston loaded by said pressure fluid and movable against a spring force, a housing for accommodating therein said first piston means and provided therein with two annular grooves of predetermined width in the axial direction thereof, second means for producing a control magnitude representative of a pre-selected desired vehicle speed including second piston means operatively connected with said driver-operated actuating means, pressure-fluid operated adjusting means operatively connected wtih said engine control means for selectively adjusting said engine control means including an adjusting piston and cylinder assembly, one of said annular grooves being connected with said adjusting cylinder and the other with the fluid pressure supply, means including said first and second piston means for effectively comparing said two control magnitudes wtih each other and thereby produce a control effect on said pressure fluid system, bore means provided in said first piston means for connecting the inside thereof with said other annular groove, further aperture means in said first piston means effectively forming control edges and operatively connecting said inside with said one annular groove, and means constituted in part by said bore means and aperture means for operatively connecting said comparing means with said adjusting means to block the path of said pressure fluid from said pressure supply to said adjusting cylinder in case of substantial coincidence of said two control magnitudes and for opening said path in case of non-coincidence therebetween, and further connecting means operatively connecting said actuating means with said second means in such a manner that said second control magnitude and therewith said desired speed is at all times preselected by the respective position of said actuating means.

25. Apparatus for the automatic regulation of the vehicle speed of engine-driven vehicles, especially motor vehicles, having an engine provided with engine control means and a pressure fluid system with pressure supply means of which the fluid pressure is controlled continuously in dependence on the vehicle speed, comprising driver-operated actuating means for selectively adjusting said engine control means, first means for producing a control magnitude representative of the existing vehicle speed including first spring-loaded piston means constructed as hollow plunger piston loaded by said pressure fluid and movable against a spring force, a housing for said first piston means, and provided therein with two annular grooves of predetermined width in the axial direction, second means for producing a control magnitude representative of a preselected desired vehicle speed including second piston means slidably arranged within said first piston means and operatively connected with said driver-operated actuating means, bore means within said first piston means for connecting the inside thereof with one of said annular grooves and aperture means within said first piston means for connecting the inside thereof with the other of said annular grooves, said aperture means effectively constituting two control edges, pressure-fluid operated adjusting means in communication with said other annular groove and operatively connected with said engine control means for selectively adjusting said engine control means, said one annular groove being connected with said fluid pressure supply means, said second piston means being provided with two annular projections, one of said projections being disposed adjacent the end face of said second piston means facing the bottom of said plunger piston and corresponding in width to the distance between said control edges and the other of said projections being disposed near the end of said plunger piston, means including said first and second piston means for effectively comparing said two magnitudes with each other and thereby valve said pressure fluid system in dependence on the deviation between said magnitudes, by selectively blocking the path of said pressure fluid to and from said adjusting means in case of substantial coincidence of the control magnitudes and for selectively releasing said path to selectively supply or exhaust the pressure fluid from said adjusting means in case of non-coincidence between said control magnitudes in dependence on the sense of deviation therebetween, and connecting means operatively connecting said actuating means with said second means in such a manner that said second control magnitude and therewith said desired speed is at all times preselected by the respective position of said actuating means.

26. Apparatus for the automatic regulation of the vehicle speed of engine-driven vehicles, especially motor vehicles, having an engine provided with engine control means and a pressure fluid system with pressure supply means of which the fluid pressure is controlled continuously in dependence on the vehicle speed, comprising driver-operated actuating means for selectively adjusting said engine control means, first means for producing a control magnitude representative of the existing vehicle speed including first spring-loaded piston means constructed as hollow plunger piston loaded by said pressure fluid and movable against a spring force, a housing for said first piston means, and provided therein with two annular grooves of predetermined width in the axial direction, said housing including a housing portion connected with the discharge of said system so as to be substantially pressureless at all times, second means for producing a control magnitude representative of a preselected desired vehicle speed including second piston means slidably arranged within said first piston means and operatively connected with said driver-operated actuating means, bore means within said first piston means for connecting the inside thereof with one of said annular grooves and aperture means within said first piston means for connecting the inside thereof with the other of said annular grooves, said aperture means effectively constituting two control edges, pressure-fluid operated adjusting means in communication with said engine other annular groove and operatively connected with said engine control means for selectively adjusting said engine control means, said one annular groove being connected with said fluid pressure supply means, said second piston means being provided with two annular projections, one of said projections being disposed adjacent the end face of said second piston means facing the bottom of said plunger piston and corresponding in width to the distance between said control edges and the other of said projections being disposed near the end of said plunger piston, said second piston means being also provided with a longitudinal bore and with cross bore means for connecting the end face of said second piston means facing the bottom of said plunger piston with the housing space in said housing portion disposed outside of said plunger piston and of said other annular projection, means including said first and second piston means for effectively comparing said two magnitudes with each other and thereby valve said pressure fluid system in dependence on the deviation between said magnitudes, by selectively blocking the path of said pressure fluid to and from said adjusting means in case of substantial coincidence of the control magnitudes and for selectively releasing said path to selectively supply or exhaust the pressure fluid from said adjusting means in case of non-coincidence between said control magnitudes in dependence on the sense of deviation therebetween, and connecting means operatively connecting said actuating means with said second means in such a manner that said second control magnitude and therewith said desired speed is at all times preselected by the respective position of said actuating means.

27. Apparatus for the automatic regulation of the vehicle speed of engine-driven vehicles, especially motor vehicles, having an engine provided with engine control means, comprising first transmitter means for producing a first control magnitude representative of a preselected desired vehicle speed, second transmitter means for producing a second control magnitude representative of the existing vehicle speed, comparing means for comparing with each other said two control magnitudes and for producing a control effect in response to any deviation therebetween, adjusting means having an adjusting member adapted to selectively adjust said control means, first connecting means operatively connecting said comparing means with said adjusting means for rendering operative said adjusting means in dependence on said control effect produced by the deviation between said magnitudes, a single driver-operated actuating means, first linkage means operatively connecting said actuating means with said engine control means for selectively adjusting said engine control means including a coupling member adapted to be adjusted by said adjusting member, second connecting means including second linkage means operatively connecting said actuating means with said first transmitter means in such a manner that said desired value is preselected by the respective position of said actuating means, said actuating means being so connected with said first transmitter means through said second linkage means and with said engine control means through said first linkage means that said engine control means is adapted to be displaced in the closing direction thereof by said driver-operated actuating means with said adjusting member in any position thereof.

28. Apparatus for the automatic regulation of the vehicle speed of engine-driven vehicles, especially motor vehicles, having an engine provided with engine control means, comprising first transmitter means for producing a first control magnitude representative of a preselected desired vehicle speed, second transmitter means for producing a second control magnitude representative of the existing vehicle speed, comparing means for comparing with each other said two control magnitudes and for producing a control effect in response to any deviation therebetween, adjusting means having a longitudinally displaceable adjusting member provided with a pin adapted to selectively adjust said control means, first means operatively connecting said comparing means with said adjusting means for rendering operative said adjusting means in dependence on said control effect produced by the deviation between said magnitudes, a single driver-operated actuating means including an actuating member, first linkage means operatively connecting said actuating means with said engine control means for selectively adjusting said engine control means including a bell-crank, shaft means operatively connecting said actuating member with said bell-crank, a two-armed coupling member operatively connected with one arm thereof to said bell-crank, sleeve means rotatably supported on said shaft means, lever means operatively connecting said sleeve means with the other arm of said two-armed coupling member, a linkage operatively connecting said sleeve means with said engine control means, said coupling member being provided with an elongated aperture into which engages said pin, means including second linkage means operatively connecting said bell crank with said first transmitter means in such a manner that said desired value is preselected by the respective position of said actuating means, first linkage means so connecting said actuating means with said first transmitter means and said second linkage means so connecting said bell-crank with said engine control means that said engine control means is adapted to be displaced in the closing direction thereof by said driver-operated actuating member with said adjusting member in any position thereof.

29. Apparatus for the automatic regulation of the vehicle speed of engine-driven vehicles, especially motor vehicles, having an engine provided with engine control means, comprising first transmitter means for producing a first control magnitude representative of a preselected desired vehicle speed, second transmitter means for producing a second control magnitude representative of the exitsing vehicle speed, comparing means for comparing with each other said two control magnitudes and for producing a control effect in response to any deviation therebetween, adjusting means having a longitudinally displaceable adjusting member provided with a pin adapted to selectively adjust said control means, first means operatively connecting said comparing means with said adjusting means for rendering operative said adjusting means in dependence on said control effect produced by the deviation between said magnitudes, a single driver-operated actuating means including an actuating member, first linkage means operatively connecting said actuating means with said engine control means for selectively adjusting said engine control means including a bell-crank, shaft means operatively connecting said actuating member with said bell-crank, a two-armed coupling member operatively connected with one arm thereof to said bell-crank, sleeve means rotatably supported on said shaft means, lever means operatively connecting said sleeve means with the other arm of said two-armed coupling member, a linkage operatively connecting said sleeve means with said engine control means, said coupling member being provided with an elongated aperture into which engages said pin, means including second linkage means operatively connecting said bell crank with said first transmitter means in such a manner that said desired value is preselected by the respective position of said actuating means, first linkage means so connecting said actuating means with said first transmitter means and said second linkage means so connecting said bell-crank with said engine control means that said engine control means is adapted to be displaced in the closing direction thereof by said driver-operated actuating member with said adjusting member in any position thereof, and feed-back means operatively connecting said engine control means with one of said transmitter means for transmitting the movement of said engine control means back to said one transmitter means.

30. An apparatus as defined in claim 29, wherein said one transmitter means is said second transmitter means which operates according to the tachometer principle and includes a return spring having an abutment, and wherein said feed-back means operatively connects said sleeve means with said abutment.

31. Apparatus for the automatic regulation of the vehicle speed of engine-driven vehicles, especially motor vehicles, having an engine provided with engine control means, comprising first transmitter means for producing a first control magnitude representative of a preselected desired vehicle speed, second transmitter means for producing a second control magnitude representative of the existing vehicle speed, comparing means for comparing with each other said two control magnitudes and for producing a control effect in response to any deviation therebetween, adjusting means having an adjusting member adapted to selectively adjust said control means, first connecting means operatively connecting said comparing means with said adjusting means for rendering operative said adjusting means in dependence on said control effect produced by the deviation between said magnitudes, a single driver-operated actuating means including an actuating member and a first shaft operatively connected thereto, first linkage means operatively connecting said first shaft with said engine control means for selectively adjusting said engine control means including a second shaft arranged substantially coaxially to said first shaft, two similar arms, one arm each connected to a respective shaft, a lever for each arm operatively connected near one end thereof with a corresponding arm, pivotal connecting means operatively connecting together the other ends of said levers, the lever coordinated to said engine control means being rotatably secured in a relatively fixed part, the lever coordinated to said actuating member being provided with an elongated aperture into which engages said adjusting member, second connecting means including second linkage means operatively connecting said actuating means with said first transmitter means in such a manner that said desired value is preselected by the respective position of said actuating means, said actuating means being so connected with said first transmitter means through said second linkage means and with said engine control means through said first linkage means that said engine control means is adapted to be displaced in the closing direction thereof by said driver-operated actuating means in any position of said adjusting member.

32. Apparatus for the automatic regulation of the vehicle speed of engine-driven vehicles, especially motor vehicles, having an engine provided with engine control means, comprising first transmitter means for producing a first control magnitude representative of a preselected desired vehicle speed, second transmitter means for producing a second control magnitude representative of the existing vehicle speed, comparing means for comparing with each other said two control magnitudes and for producing a control effect in response to any deviation therebetween, adjusting means having an adjusting member adapted to selectively adjust said control means, first connecting means operatively connecting said comparing means with said adjusting means for rendering operative said adjusting means in dependence on said control effect produced by the deviation between said magnitudes, a single driver-operated actuating means, first linkage means operatively connecting said actuating means with said engine control means for selectively adjusting said engine control means including a coupling member adapted to be adjusted by said adjusting member, second connecting means including second linkage means operatively connecting said actuating means with said first transmitter means in such a manner that said desired value is preselected by the respective position of said actuating means, said actuating means being so connected with said first transmitter means through said second linkage means and with said engine control means through said first linkage means that said engine control means is adapted to be displaced in the closing direction thereof by said driver-operated actuating means in any position of said adjusting member, and third connecting means operatively connecting said engine control means with one of said transmitter means to feed back the movements of said engine control means to said one transmitter means.

33. Apparatus for the automatic regulation of the vehicle speed of engine-driven vehicles, especially motor vehicles, having an engine provided with engine control means, comprising first transmitter means for producing a first control magnitude representative of a preselected desired vehicle speed, second transmitter means for producing a second control magnitude representative of the existing vehicle speed, comparing means for comparing with each other said two control magnitudes and for producing a control effect in response to any deviation therebetween, adjusting means having an adjusting member adapted to selectively adjust said control means, first connecting means operatively connecting said comparing means with said adjusting means for rendering operative said adjusting means in dependence on said control effect produced by the deviation between said magnitudes, a single driver-operated actuating means, first linkage means operatively connecting said actuating means with said engine control means for selectively adjusting said engine control means including shaft means, a coupling member operatively connected with said shaft means and adjusted by said adjusting member, sleeve means operatively connected with said coupling member and rotatable about said shaft means, a first lever on said sleeve means and a linkage operatively connecting said first lever with said engine control means, second connecting means including second linkage means operatively connecting said actuating means with said first transmitter means in such a manner that said desired value is preselected by the respective position of said actuating means, servo-means including servo transmitter means and servo amplifier means interconnected in said first linkage means, said first lever being operatively connected with said servo-amplifier means, a second lever influencing said servo-transmitter means and in operative engagement with said coupling member, said second lever being supported with play on said sleeve means and being adapted to be tilted about the point of engagement of said first lever in accordance with the available play, said actuating means being thereby so connected with said first transmitter means through said second linkage means and with said engine control means through said first linkage means that said engine control means is adapted to be displaced in the closing direction thereof by said driver-operated actuating means in any position of said adjusting member.

34. Apparatus for the automatic regulation of the vehicle speed of engine-driven vehicles, especially motor vehicles, having an engine provided with engine control means, comprising first transmitter means for producing a first control magnitude representative of a preselected desired vehicle speed, second transmitter means for producing a second control magnitude representative of the existing vehicle speed, comparing means for comparing with each other said two control magnitudes and for producing a control effect in response to any deviation therebetween, adjusting means having an adjusting member adapted to selectively adjust said control means, first connecting means operatively connecting said comparing means with said adjusting means for rendering operative said adjusting means in dependence on said control effect produced by the deviation between said magnitudes, driver-operated actuating means, first linkage means operatively connecting said actuating means with said engine control means for selectively adjusting said engine control means including shaft means, a coupling member operatively connected with said shaft means and adapted to be adjusted by said adjusting member, sleeve means operatively connected with said coupling member and rotatable about said shaft means, a first lever on said sleeve means and a linkage operatively connecting said first lever with said engine control means, second connecting means including second linkage means operatively conecting said actuating means with said first transmitter means in such a manner that said desired value is preselected by the respective position of said actuating means, servo-means including servo transmitter means provided with a pressure actuated control piston and servo amplifier means provided with a double-acting piston interconnected in said first linkage means, said first lever being operatively connected with said servo-amplifier means, spring-loaded pressure-actuated slide valve means adapted to be displaced by the pressure fluid of the servo means against a spring force, means interconnecting said slide valve means between said servo transmitter means and said servo amplifier means in such a manner that the two sides of said double-acting piston are connected with each other in case of failure of the pressure fluid, a second lever influencing said servo-transmitter means and in operative engagement with said coupling member, said second lever being supported with play on said sleeve means and being adapted to be tilted about the point of engagement of said first lever in accordance with the available play, said actuating means being thereby so connected with said first transmitter means through said second linkage means and with said engine control means through said first linkage means that said engine control means is adapted to be displaced in the closing direction thereof by said driver-operated actuating means in any position of said adjusting member.

35. Apparatus for the automatic regulation of the vehicle speed of engine-driven vehicles, especially motor vehicles, having an engine provided with engine control means, comprising first transmitter means for producing a first electric control magnitude representative of a preselected desired vehicle speed, second transmitter means for producing a second electric control magnitude representative of the existing vehicle speed, adjusting means operatively connected with said engine control means for selectively adjusting the same including an electric motor adapted to rotate in either direction of rotation, comparing means effectively comparing with each other said two control magnitudes and for producing a control effect in response to any deviation therebetween including a desired value line to which is supplied said first electrical control magnitude and an existing value line to which is supplied said second electric control magnitude, two energizing circuits for said motor, two transistor means each controlling a respective energizing circuit, connecting means interconnecting said two transistor means with said two lines in such a way that one of said transistor means energizes one of said energizing circuits to rotate said motor in one direction during current flow from one of said lines to the other and that the other of said transistor means energizes the other of said energizing circuits to rotate said motor in the opposite direction during current flow from said other line to said one line, a single driver-operated actuating means operatively connected with said engine control means for selectively adjusting said engine control means to any desired position thereof, and further connecting means operatively connecting said actuating means with said first transmitter means in such a manner that said desired value is preselected by the respective position of said actuating means.

36. Apparatus for the automatic regulation of the vehicle speed of engine-driven vehicles, especially motor vehicles, having an engine provided with engine control means, comprising a single driver-operated actuating means operatively connected with said engine control means for selectively adjusting said engine control means to any desired position thereof, first transmitter means for producing a first electric control magnitude representative of a preselected desired vehicle speed including a voltage source and potentiometer means connected across said voltage source and provided with a movable arm actuated by said driver-operated actuating means, second transmitter means for producing a second electric control magnitude representative of the existing vehicle speed, adjusting means operatively connected with said engine control means for selectively adjusting the same including an electric motor adapted to rotate in either direction of rotation, comparing means effectively comparing with each other said two control magnitudes and for producing a control effect in response to any deviation therebetween including rectifier means to which is supplied said first electric control magnitude and said second electric control magnitude, an existing value line also connected to said rectifier means, a desired value line connected to one terminal of said voltage source, two energizing circuits for said motor, two transistor means each controlling a respective energizing circuit, connecting means interconnecting said two transistor means with said two lines in such a way that one of said transistor means energizes one of said energizing circuits to rotate said motor in one direction during current flow from one of said lines to the other and that the other of said transistor means energizes the other of said energizing circuits to rotate said motor in the opposite direction during current flow from said other line to said one line, and further connecting means operatively connecting said actuating means with said first transmitter means in such a manner that said desired value is preselected by the respective position of said actuating means.

37. Apparatus for the automatic regulation of the vehicle speed of engine-driven vehicles, especially motor vehicles, having an engine provided with engine control means, comprising a single driver-operated actuating means operatively connected with said engine control means for selectively adjusting said engine control means to any desired position thereof, first transmitter means for producing a first electric control magnitude representative of a preselected desired vehicle speed including a voltage source and potentiometer means connected across said voltage source and provided with a movable arm actuated by said driver-operated actuating means, second transmitter means for producing a second electric control magnitude representative of the existing vehicle speed including vehicle-speed-responsive generator means, engine-speed-responsive generator means and switch means operated automatically in dependence on the speed of the vehicle for selectively connecting one or the other generator means to said rectifier means, adjusting means operatively connected with said engine control means for selectively adjusting the same including an electric motor adapted to rotate in either direction of rotation, comparing means effectively comparing with each other said two control magnitudes and for producing a control effect in response to any deviation therebetween including rectifier means to which is supplied said first electrical control magnitude and said second electric control magnitude, an existing value line also connected to said rectifier means, a desired value line connected to one terminal of said voltage source, two energizing circuits for said motor, two transistor means each controlling a respective energizing circuit, connecting means interconnecting said two transistor means with said two lines in such a way that one of said transistor means energizes one of said energizing circuits to rotate said motor in one direction during current flow from one of said lines to the other and that the other of said transistor means energizes the other of said energizing circuits to rotate said motor in the opposite direction during current flow from said other line to said one line, and further connecting means operatively connecting said actuating means with said first transmitter means in such a manner that said desired value is preselected by the respective position of said actuating means.

38. Apparatus for the automatic regulation of the vehicle speed of engine-driven vehicles, especially motor vehicles, having an engine provided with engine control means, comprising first transmitter means for producing a first electric control magnitude representative of a preselected desired vehicle speed, second transmitter means for producing a second electric control magnitude representative of the existing vehicle speed and a third electrical control magnitude representative of the existing engine speed, adjusting means operatively connected with said engine control means for selectively adjusting the same including an electric motor adapted to rotate in either direction of rotation, comparing means effectively comparing with each other the first electric control magnitude with one of the second and third electric control magnitudes for producing a control effect in response to any deviation therebetween including a desired value line to which is supplied said first electrical control magnitude and an existing value line to which is supplied said second or third electric control magnitude, two energizing circuits for said motor, two transistor means each controlling a respective energizing circuit, connecting means interconnecting said two transistor means with said two lines in such a way that one of said transistor means energizes one of said energizing circuits to rotate said motor in one direction during current flow from one of said lines to the other and that the other of said transistor means energizes the other of said energizing circuits to rotate said motor in the opposite direction during current flow from said other line to said one line, driver-operated actuating means for selectively adjusting said engine control means, and further connecting means operatively connecting said actuating means with said first transmitter means in such a manner that said desired value is preselected by the respective position of said actuating means.

39. A system for the automatic regulation of the vehicle speed of engine-driven vehicles, especially motor vehicles, having an engine provided with engine control means, comprising first transmitter means for producing a first control magnitude representative of a preselected desired vehicle speed, second transmitter means for producing a second control magnitude representative of the existing vehicle speed, comparing means for comparing with each other said two control magnitudes and for producing a control effect in response to any deviation therebetween, adjusting means operatively connected with said control means for selectively adjusting said control means, first connecting means operatively connecting said comparing means with said adjusting means for rendering operative said adjusting means in dependence on said control effect produced by the deviation between said magnitudes, a single driver-operated actuating means operatively connected with said engine control means for selectively adjusting said engine control means, second connecting means operatively connecting said actuating means with said first transmitter means in such a manner that said desired value is preselected by the respective position of said actuating means, and resilient abutment means operative as yielding pressure point and adapted to be adjusted to said preselected vehicle speed, said resilient abutment means being operatively associated with said driver-operated actuating means, and a manually operated adjusting device for adjusting said abutment means.

40. A system for the automatic regulation of the vehicle speed of engine-driven vehicles, especially motor vehicles, having an engine provided with engine control means, comprising first transmitter means for producing a first control magnitude representative of a preselected desired vehicle speed, second transmitter means for producing a second control magnitude representative of the existing vehicle speed, comparing means for comparing with each other said two control magnitudes and for producing a control effect in response to any deviation therebetween, adjusting means operatively connected with said control means for selectively adjusting said control means, first connecting means operatively connecting said comparing means with said adjusting means for rendering operative said adjusting means in dependence on said control effect produced by the deviation between said magnitudes, a single driver-operated actuating means for selectively adjusting said engine control means, second connecting means operatively connecting said actuating means with said first transmitter means in such a manner that said desired value is preselected by the respective position of said actuating means, disabling means for selectively rendering said regulating system ineffectual, and resilient abutment means operative as yielding pressure point and adapted to be adjusted to said preselected vehicle speed, said resilient abutment means being operatively associated with said driver-operated actuating means, and a manually operated adjusting device including cam means for adjusting said abutment means and cam means for actuating said disabling means.

41. A system according to claim 39, further comprising holding means for holding said actuating means in abutment against said resilient abutment means.

42. A system according to claim 41, further comprising means at least at one of the brake and clutch pedals of the vehicle for disabling said holding means upon actuation of the respective pedal.

43. A system according to claim 39, wherein said resilient abutment means is itself constructed as holding magnet to hold said actuating means in abutment thereagainst.

44. Apparatus for the automatic regulation of the vehicle speed of engine-driven vehicles, especially motor vehicles, having an engine provided with engine control means, comprising first transmitter means for producing a first control magnitude representative of a preselected desired vehicle speed, second transmitter means for producing a second control magnitude representative of the existing vehicle speed, comparing means for comparing with each other said two control magnitudes and for producing a control effect in response to any deviation therebetween, adjusting means operatively connected with said control means for selectively adjusing said control means, first connecting means operatively connecting said comparing means with said adjusting means for rendering operative said adjusting means in dependence on said control effect produced by the deviation between said magnitudes, driver-operated actuating means including a single selectively actuated member for selectively adjusting said engine control means by the movements of said single selectively actuated member, and second connecting means operatively connecting the single selectively actuated member of said actuating means with said first transmitter means in such a manner that the desired value is preselected at all times by the respective position of said single selectively actuated member.

References Cited by the Examiner

UNITED STATES PATENTS

| | | | |
|---|---|---|---|
| 2,661,071 | 12/1953 | Hoener | 180—82.1 |
| 2,671,542 | 3/1954 | Robnett. | |
| 2,897,906 | 8/1959 | Brueder | 180—82.1 |
| 2,971,596 | 2/1961 | Davis et al. | 180—82.1 |
| 2,972,391 | 2/1961 | Faiver et al. | 180—82.1 |
| 3,062,310 | 11/1962 | McCathran et al. | 180—82.1 |
| 3,062,312 | 11/1962 | Dietrich et al. | 180—82.1 |

DON A. WAITE, *Primary Examiner.*